(12) United States Patent
Toyoda et al.

(10) Patent No.: US 8,974,847 B2
(45) Date of Patent: Mar. 10, 2015

(54) FOOD WITH DEPRESSION

(75) Inventors: Ikuru Toyoda, Kanagawa (JP); Kazumitsu Ohtsubo, Kanagawa (JP)

(73) Assignee: Meiji Co., Ltd., Tokyo (JP)

( * ) Notice: Subject to any disclaimer, the term of this patent is extended or adjusted under 35 U.S.C. 154(b) by 581 days.

(21) Appl. No.: 12/445,951

(22) PCT Filed: Oct. 17, 2007

(86) PCT No.: PCT/JP2007/001126
§ 371 (c)(1),
(2), (4) Date: May 28, 2009

(87) PCT Pub. No.: WO2008/050473
PCT Pub. Date: May 2, 2008

(65) Prior Publication Data
US 2010/0316783 A1   Dec. 16, 2010

(30) Foreign Application Priority Data
Oct. 18, 2006  (JP) .................. 2006-283857

(51) Int. Cl.
| | |
|---|---|
| *A23C 9/16* | (2006.01) |
| *A23L 1/10* | (2006.01) |
| *A23C 9/00* | (2006.01) |
| *A23G 3/02* | (2006.01) |
| *A23G 1/00* | (2006.01) |

(Continued)

(52) U.S. Cl.
CPC .. *A23C 9/18* (2013.01); *A23L 2/395* (2013.01)
USPC ........... 426/588; 426/464; 426/467; 426/285; 426/454; 426/512

(58) Field of Classification Search
USPC .................. 426/464, 467; 424/285, 454, 588; 425/183
See application file for complete search history.

(56) References Cited

U.S. PATENT DOCUMENTS

| | | |
|---|---|---|
| 3,279,995 A | 10/1966 | Reid |
| 3,358,379 A | 12/1967 | Coley et al. |

(Continued)

FOREIGN PATENT DOCUMENTS

| | | |
|---|---|---|
| DE | 1110505 B | 7/1961 |
| GB | 745470 A | 2/1956 |

(Continued)

OTHER PUBLICATIONS

Hattori et al., JP 08-11213 B Translation.*

(Continued)

*Primary Examiner* — Rena L Dye
*Assistant Examiner* — Assaf Zilbering
(74) *Attorney, Agent, or Firm* — Osha Liang LLP

(57) ABSTRACT

[Object] To provide a food product that exhibits excellent solubility, such as solid milk.
[Means] The above purpose is achieved by a food product having a top surface (4) including a flat area (2); a bottom surface (8) including a flat area (6) parallel to the flat area (2) on the top surface; and a recess (10) formed on the top surface (4) and a recess (12) formed on the bottom surface (8), wherein when the food product has both the recess (10) formed on the top surface (4) and the recess (12) formed on the bottom surface (8), the total of the largest depth $d_u$ (14) of the recess (10) on the top surface and the largest depth $d_d$ (16) of the recess (12) on the bottom surface is 30% or larger of the thickness w (18) of the food product.

8 Claims, 16 Drawing Sheets

(51) Int. Cl.
*A23L 1/00* (2006.01)
*A23C 9/18* (2006.01)
*A23L 2/395* (2006.01)

(56) References Cited

U.S. PATENT DOCUMENTS

| | | | | |
|---|---|---|---|---|
| 4,647,448 | A | * | 3/1987 | Tovey ............................ 424/467 |
| 5,520,929 | A | * | 5/1996 | Makino et al. ................. 424/467 |

FOREIGN PATENT DOCUMENTS

| | | | | |
|---|---|---|---|---|
| GB | 1204445 | A | | 9/1970 |
| GB | 1204445 | A | * | 1/1971 ................... 426/588 |
| JP | 8-11213 | Y1 | | 7/1933 |
| JP | 45-39018 | B1 | | 12/1970 |
| JP | 48-13517 | A | | 2/1973 |
| JP | 49-4948 | B1 | | 2/1974 |
| JP | 49-130189 | Y1 | | 11/1974 |
| JP | 61-118280 | Y1 | | 7/1986 |
| JP | 62-36173 | A | | 2/1987 |
| JP | 8-333236 | A | | 12/1996 |
| JP | 09-104619 | | | 4/1997 |

OTHER PUBLICATIONS

Cruaud et al., "Correlation between Porosity and DIssolution Rate Constants for Disintegrating Tablets". Journal of Pharmaceutical Sciences vol. 69, No. 5, May 1980.*

International Search Report, w/English translation, issued Feb. 26, 2008, from the Japanese Patent Office in Application No. PCT/JP2007/001126. (4 pages).

Translation of PCT International Preliminary Report on Patentability (IPRP) and Written Opinion issued by the International Bureau on Apr. 30, 2009, in International Application No. PCT/JP2007/001126. (Note: All references cited were previously submitted in the IDS filed May 28, 2009) (7 pages).

Patent Abstracts of Japan, English Abstract for Japanese Patent Application No. JP 09-104619 (1 page).

Extendened European Search Report dated Apr. 14, 2011, issued by the European Patent Office in related European Patent Application No. 07827905.6, with explanation of relevance of citations (11 pages). (Note: All of the Japanese references cited in this Extended European Search Report were previously cited in the Information Disclosure Statement filed May 28, which were considered and initialed by the Examiner and returned in the Office Action dated Mar. 3, 2011.).

* cited by examiner

Fig. 1
Fig. 1(a)
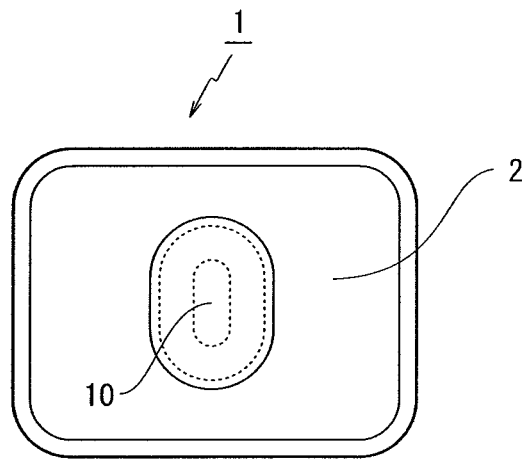
Fig. 1(b)
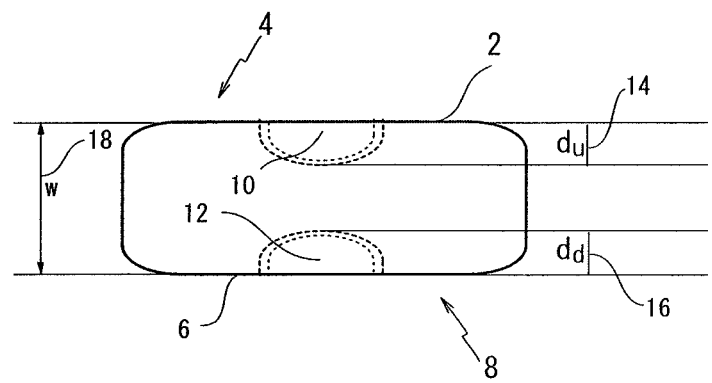
Fig. 1(c)
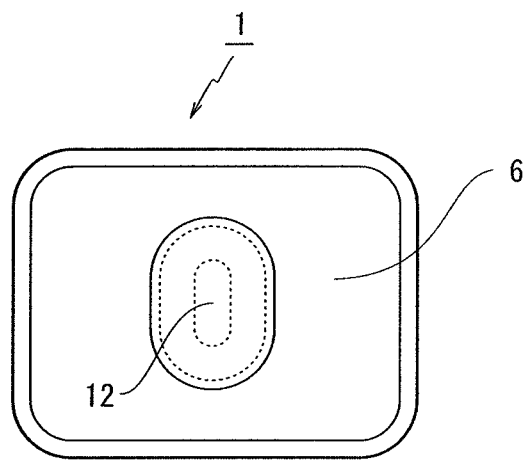

Fig. 2
Fig. 2(a)
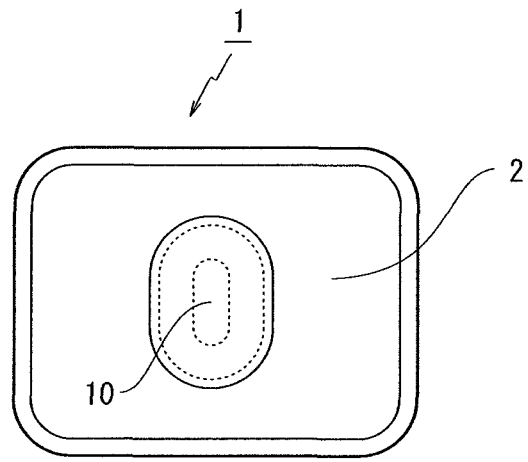
Fig. 2(b)
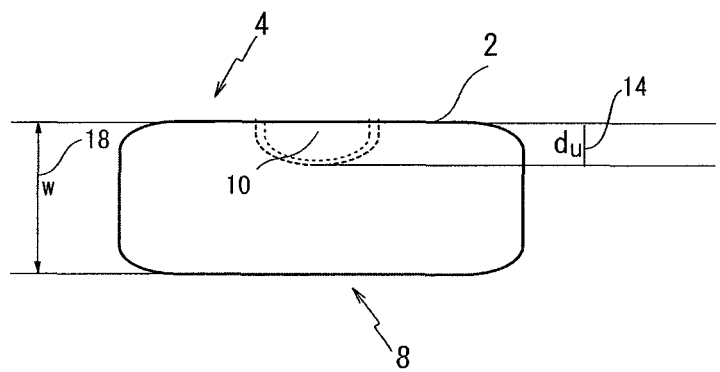
Fig. 2(c)
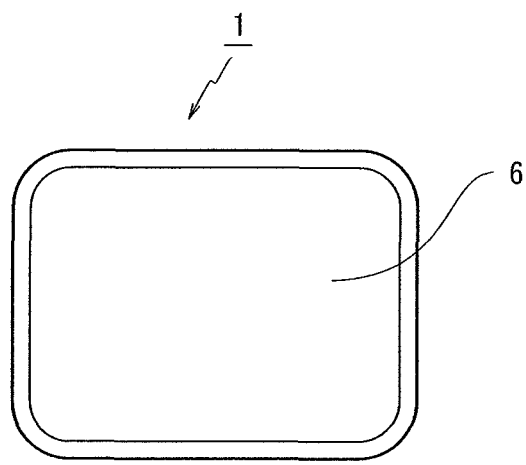

Fig. 3
Fig. 3(a)
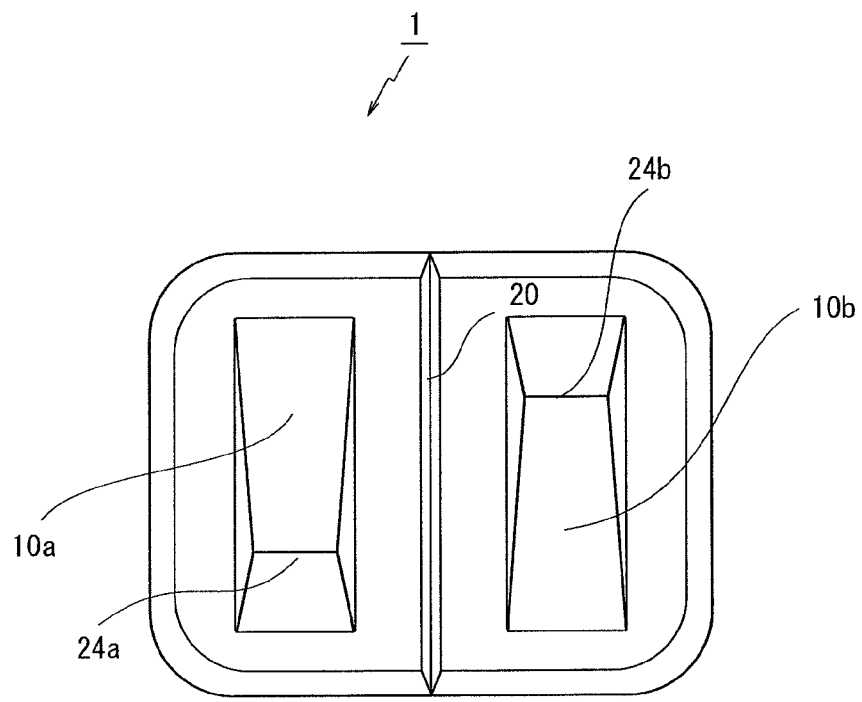
Fig. 3(b)
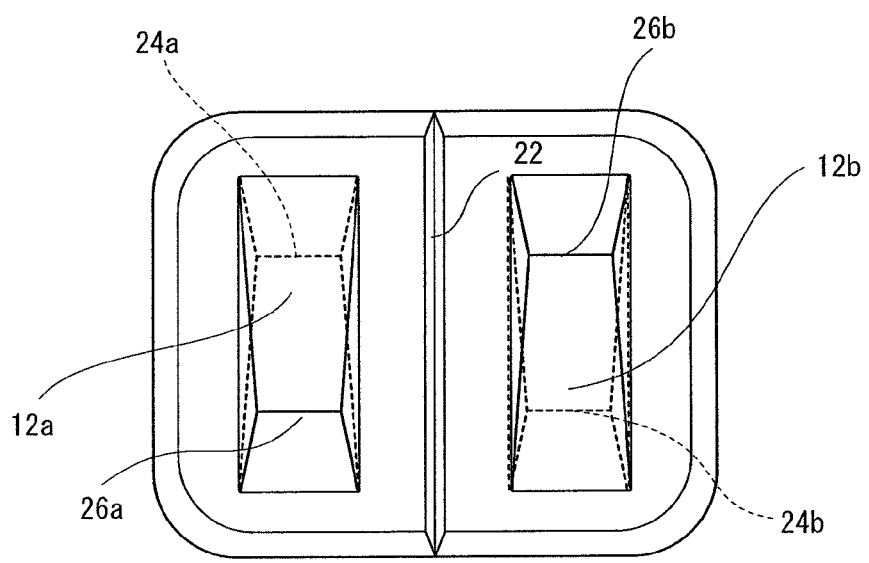

Fig. 4
Fig. 4(a)
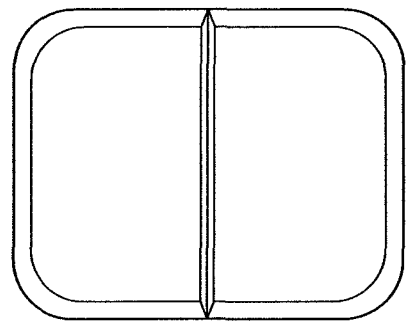
Fig. 4(b)
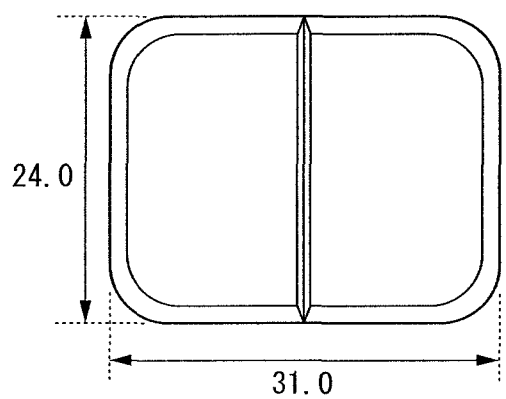
Fig. 4(c)
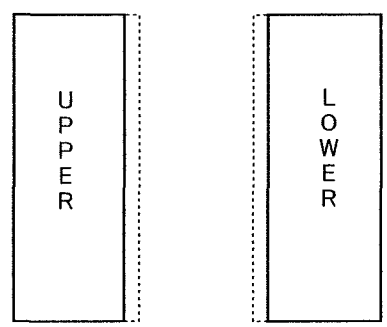

Fig. 5
Fig. 5(a)
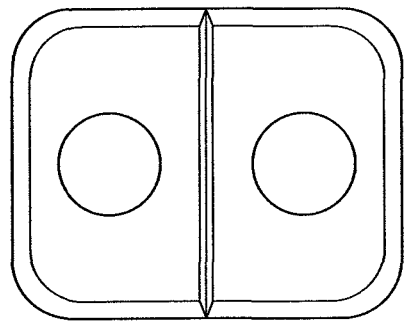
Fig. 5(b)
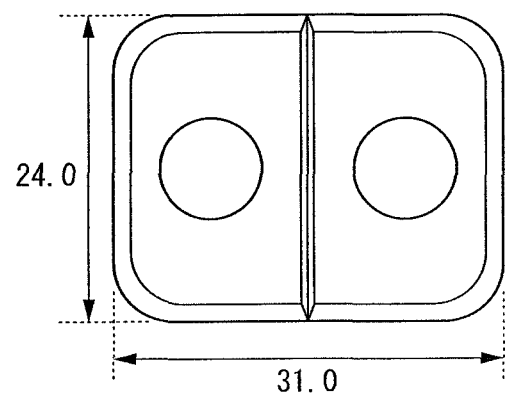
Fig. 5(c)
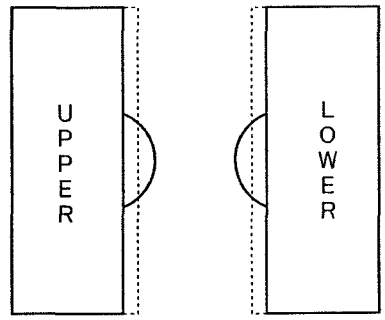

Fig. 6
Fig. 6(a)
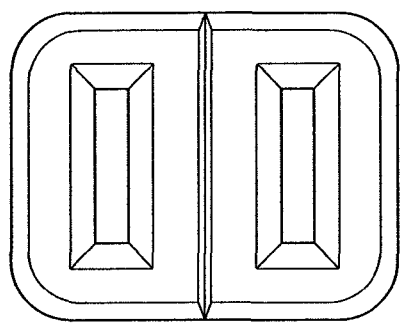
Fig. 6(b)
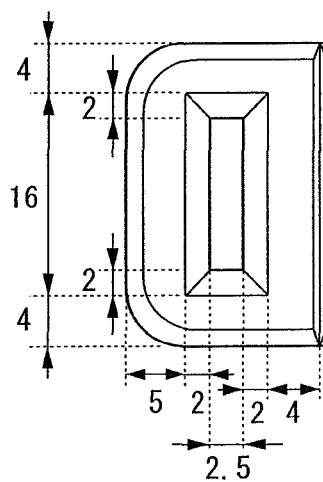
Fig. 6(c)
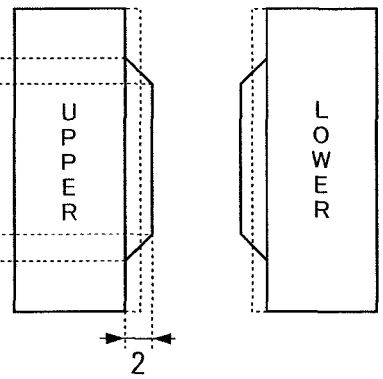

Fig. 7
Fig. 7(a)
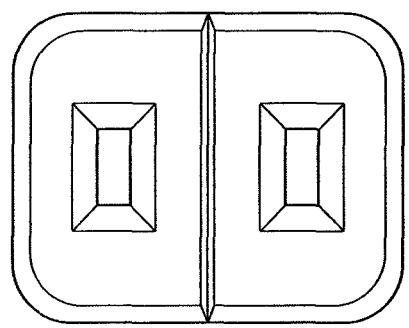
Fig. 7(b)
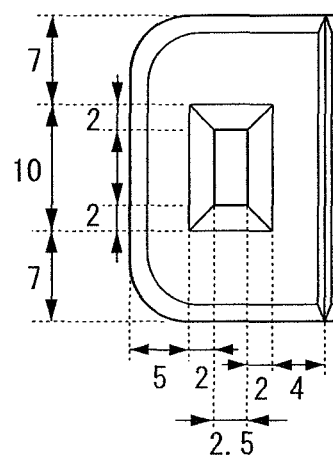
Fig. 7(c)
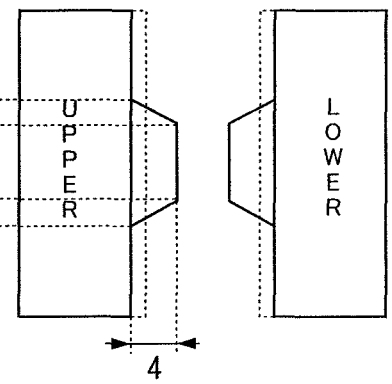

Fig. 8
Fig. 8(a)
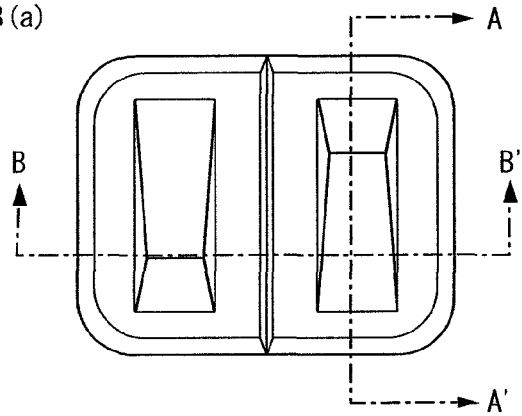
Fig. 8(b)
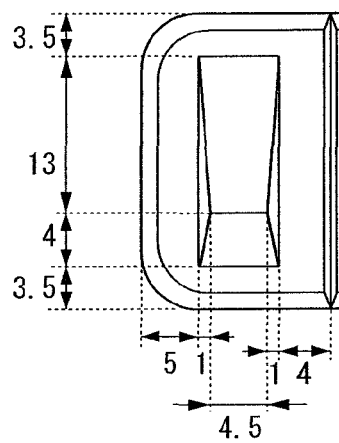
Fig. 8(c)
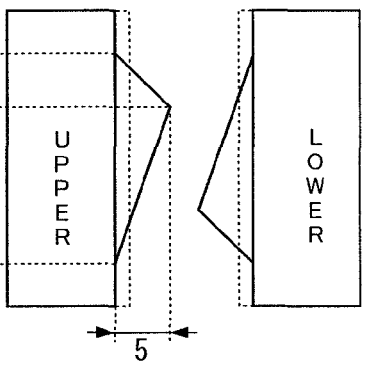
Fig. 8(d)
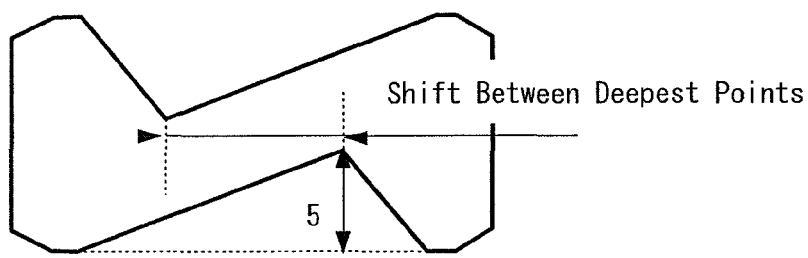
Fig. 8(e)
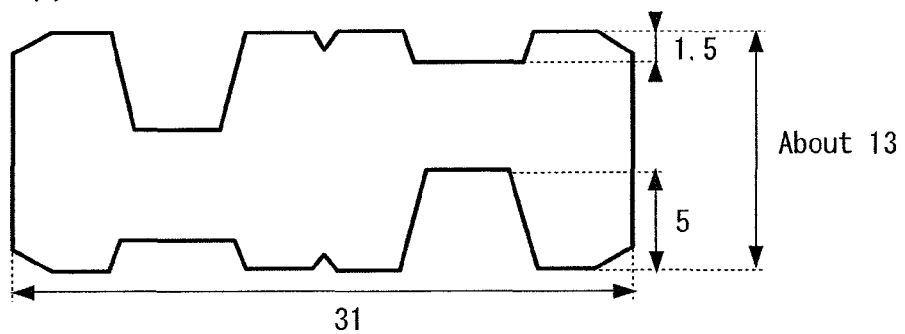

Fig. 9
Fig. 9(a)
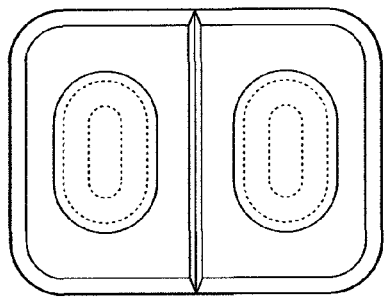
Fig. 9(b)
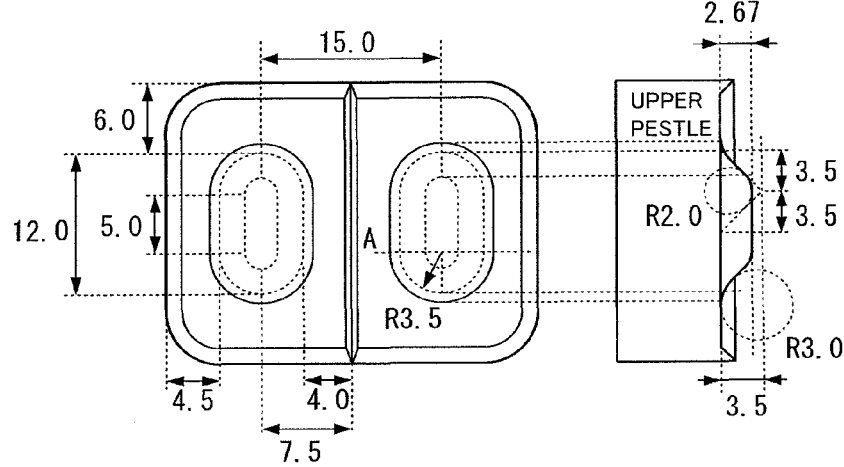
Fig. 9(c)
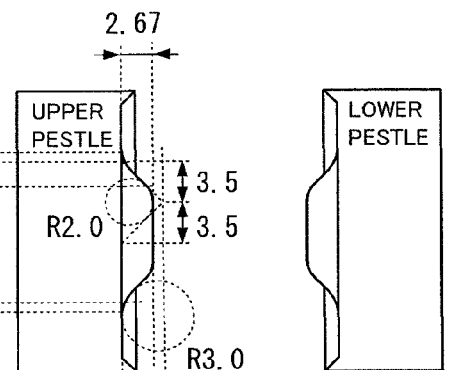
Fig. 9(d)
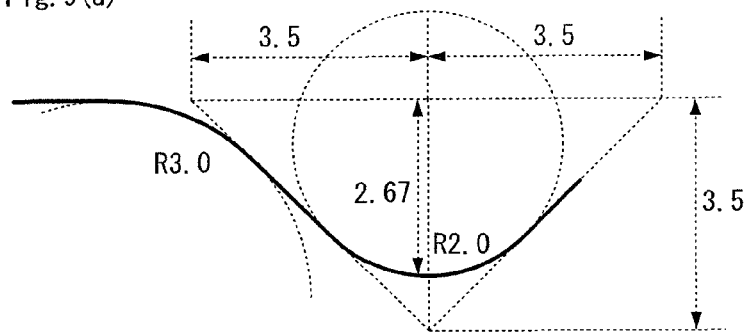

Fig. 10
Fig. 10(a)
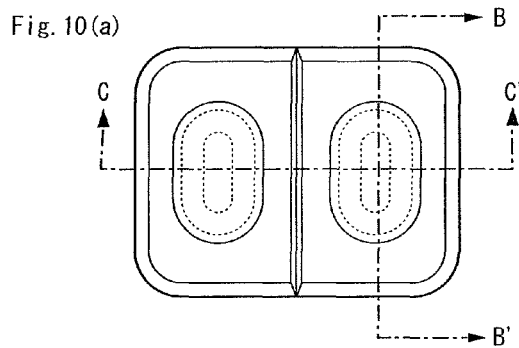
Fig. 10(b)
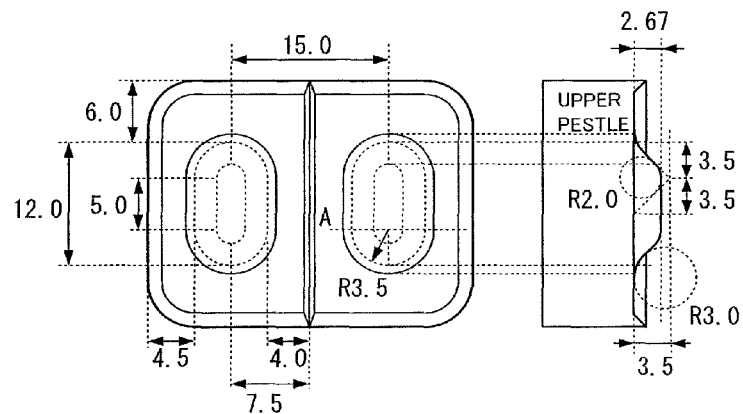
Fig. 10(c)
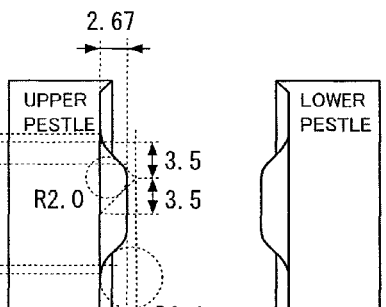
Fig. 10(d)
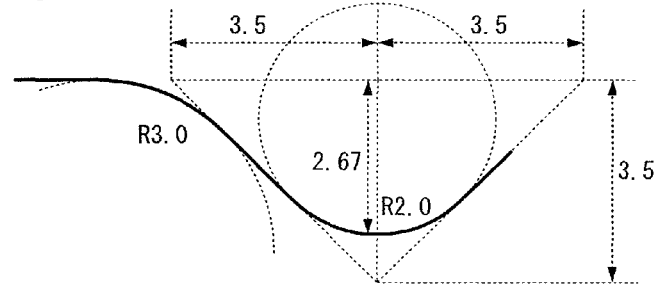
Fig. 10(e)
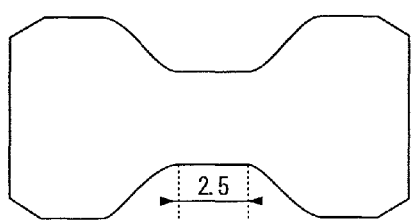
Fig. 10(f)
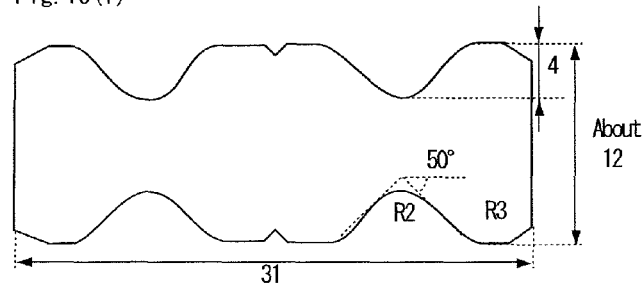

Fig. 11
Fig. 11(a)
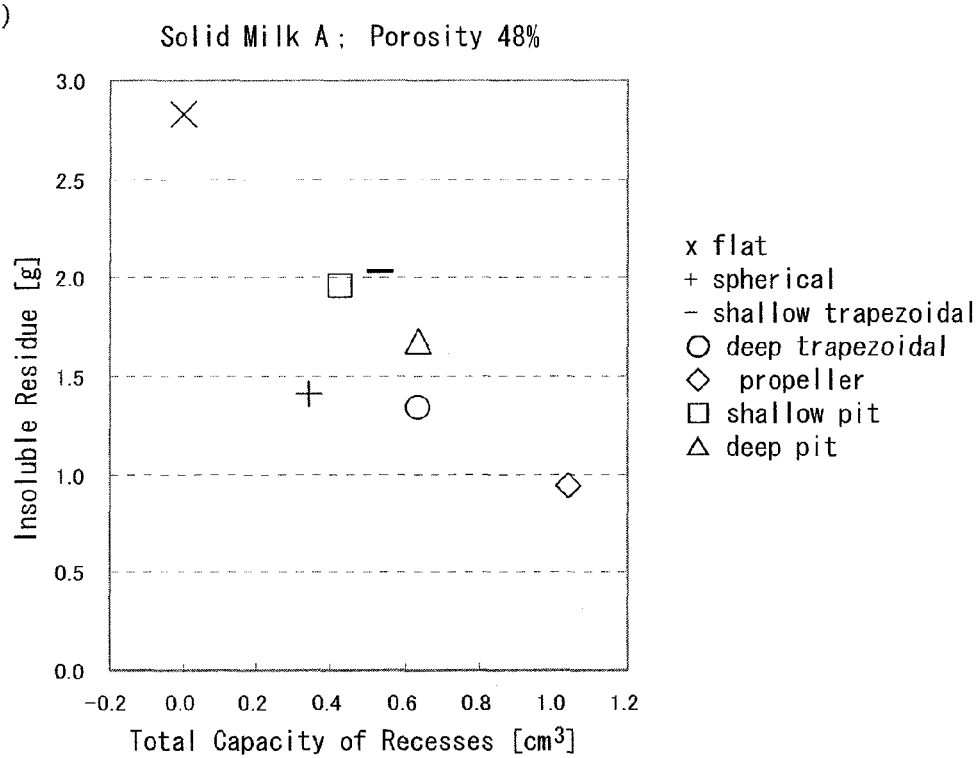
Fig. 11(b)
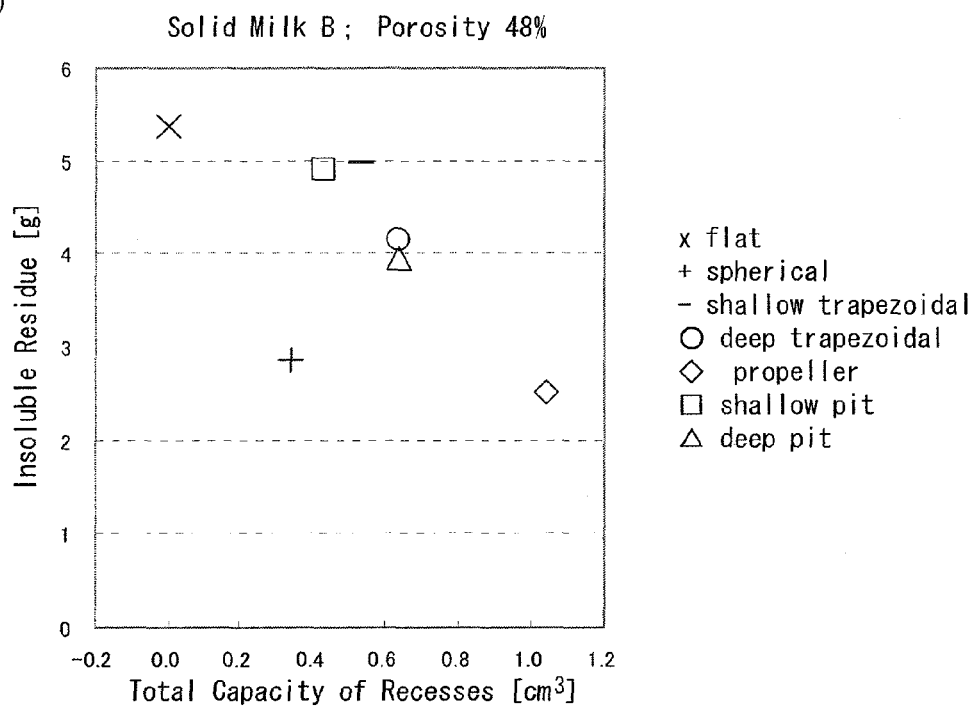

Fig. 12
Fig. 12(a)
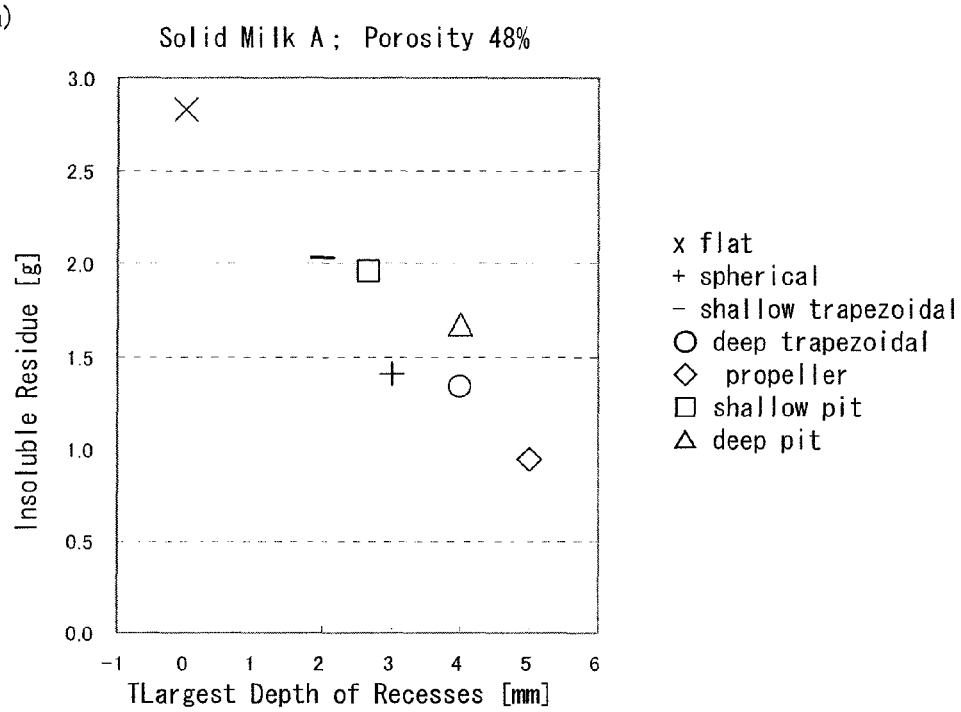
Fig. 12(b)
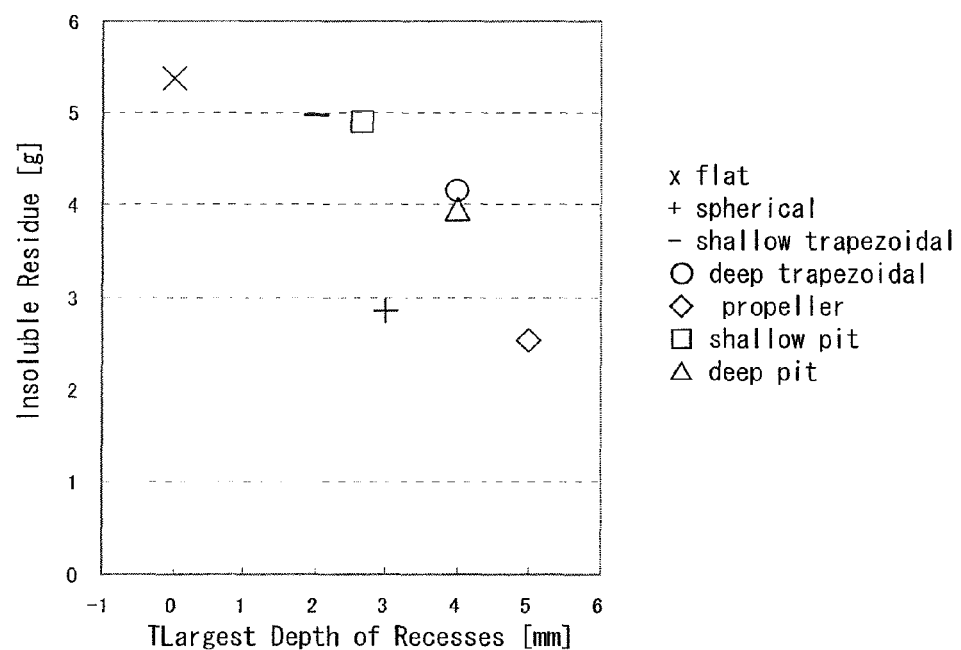

Fig. 13
Fig. 13(a)
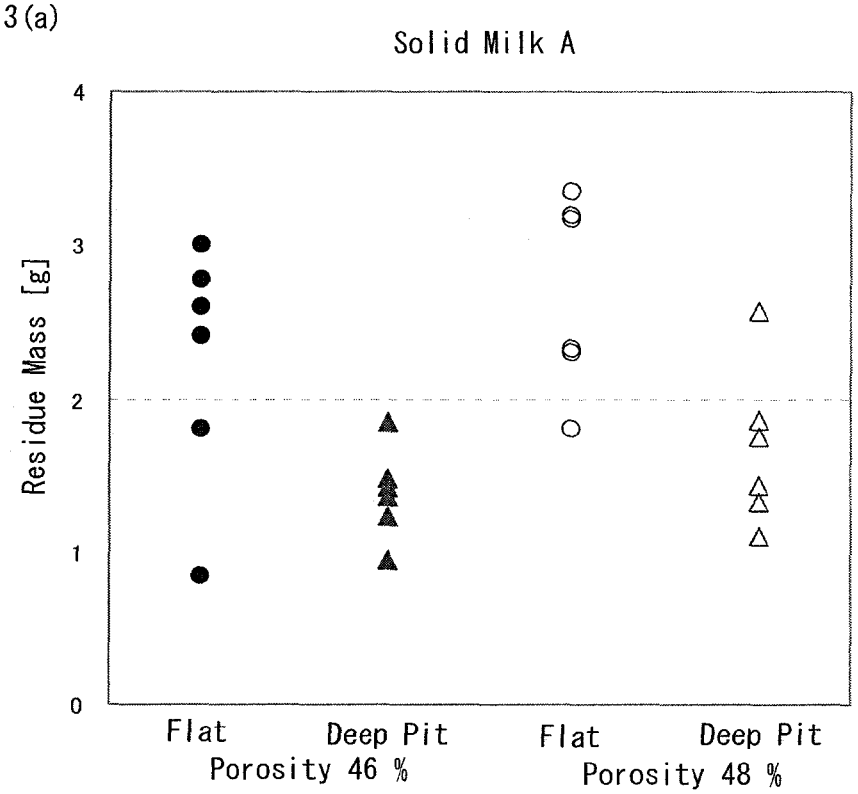
Fig. 13(b)
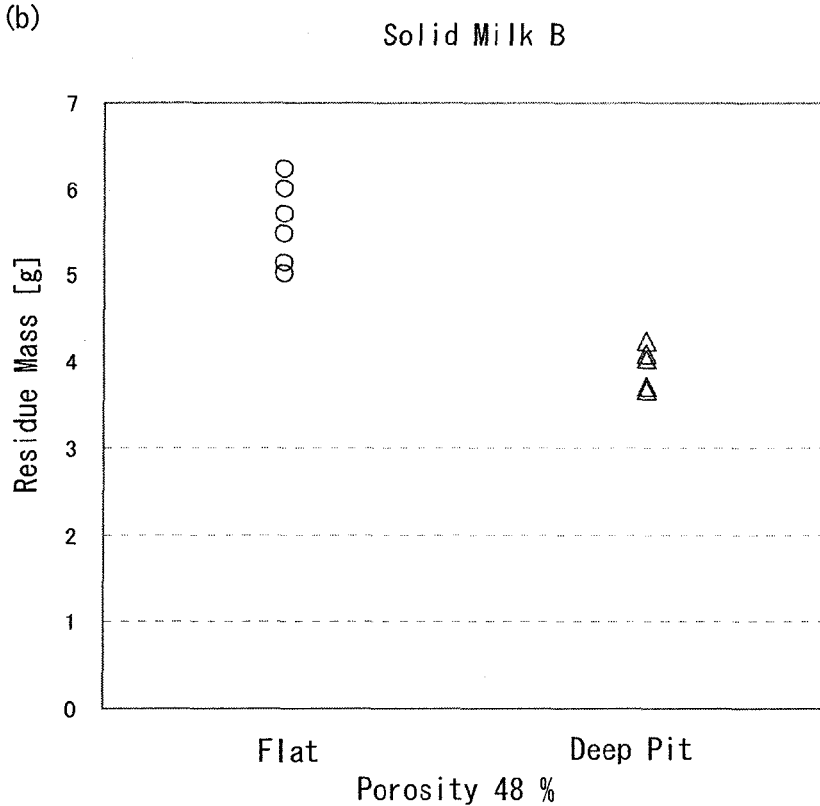

Fig. 14
Fig. 14(a)
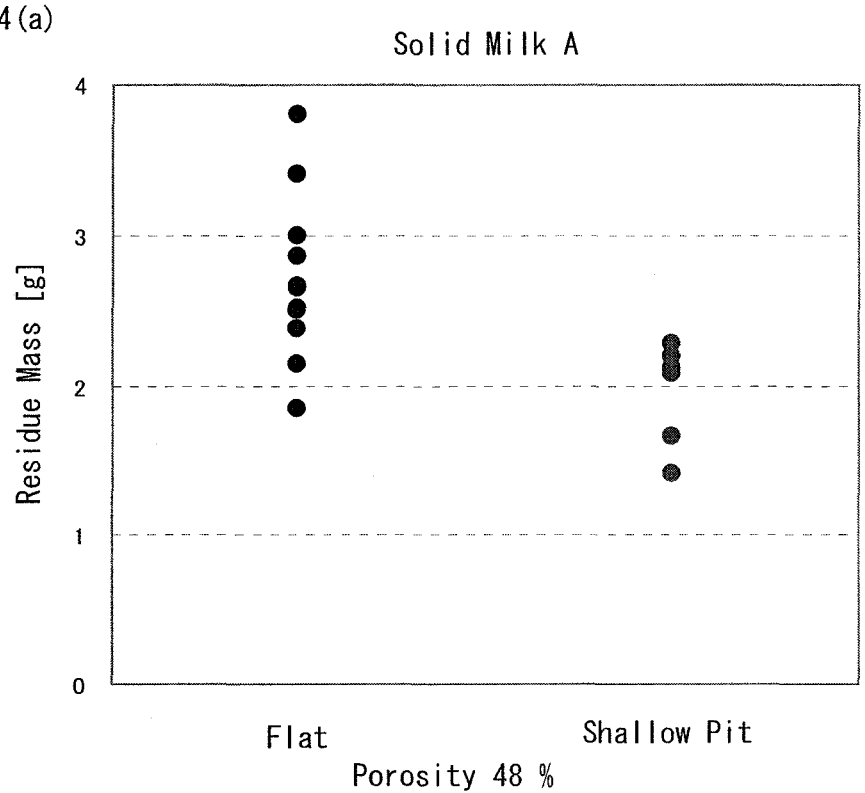
Fig. 14(b)
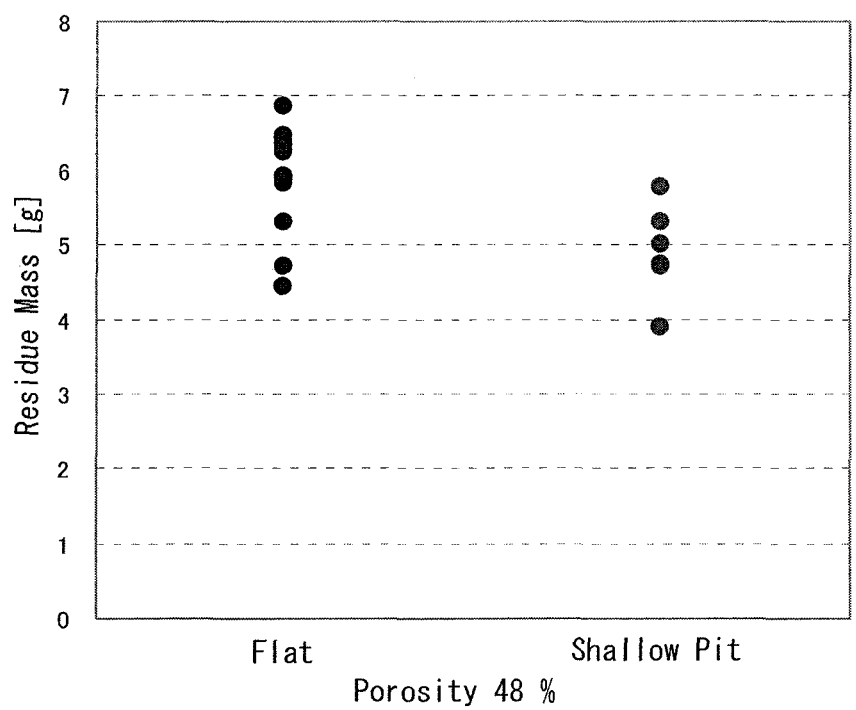

Fig. 15
Fig. 15(a)
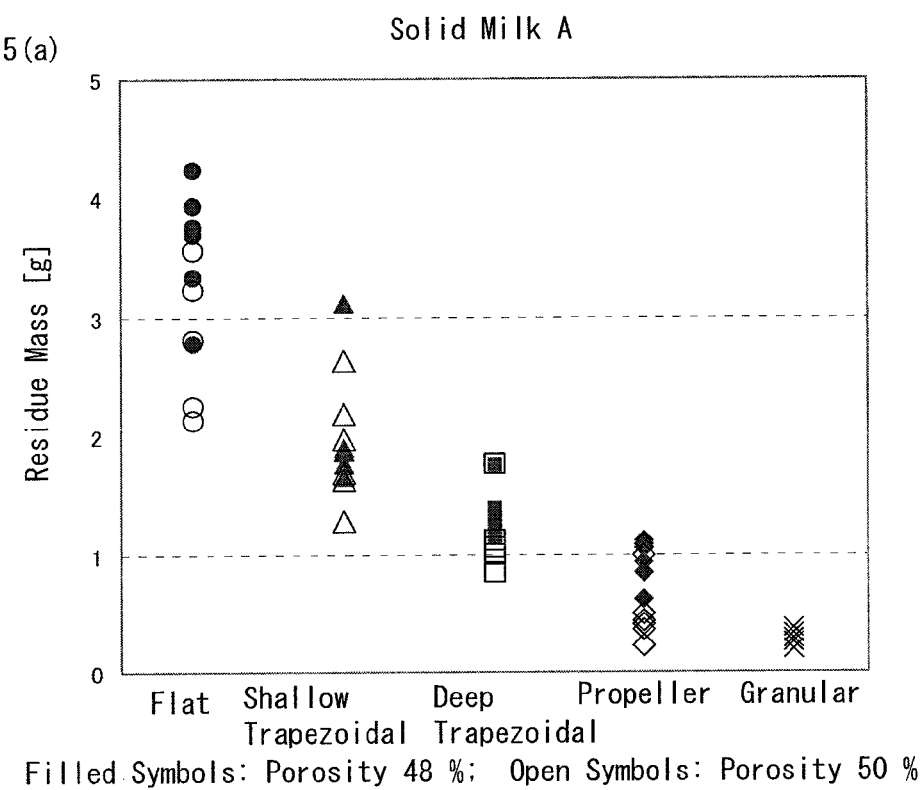
Solid Milk A
Filled Symbols: Porosity 48 %; Open Symbols: Porosity 50 %
Fig. 15(b)
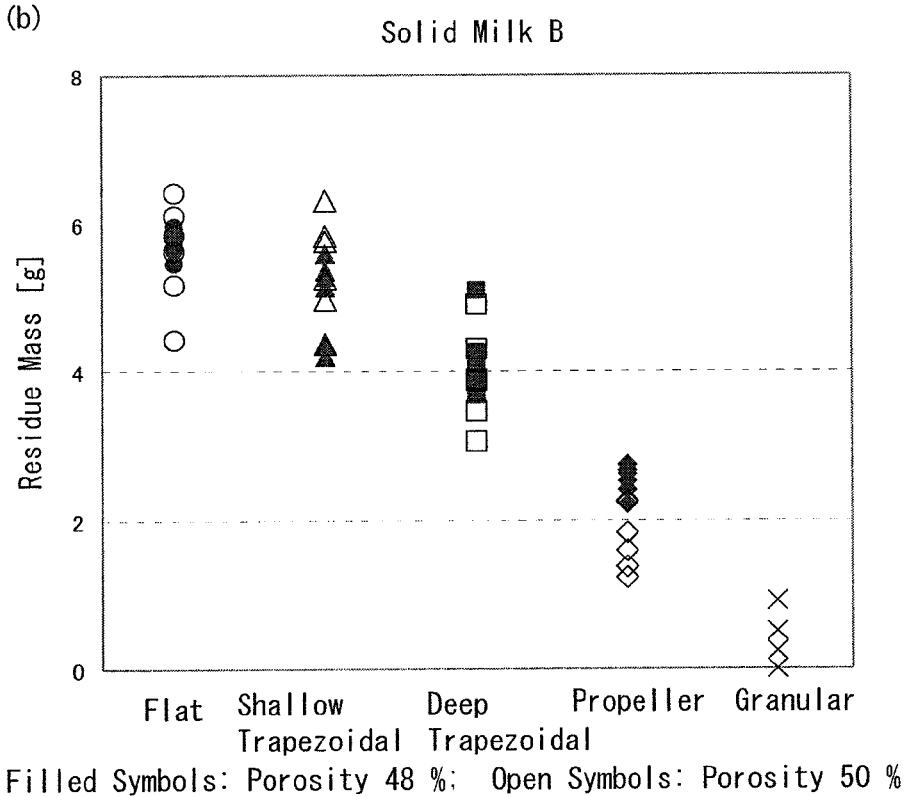
Solid Milk B
Filled Symbols: Porosity 48 %; Open Symbols: Porosity 50 %

Fig. 16
Fig. 16(a)
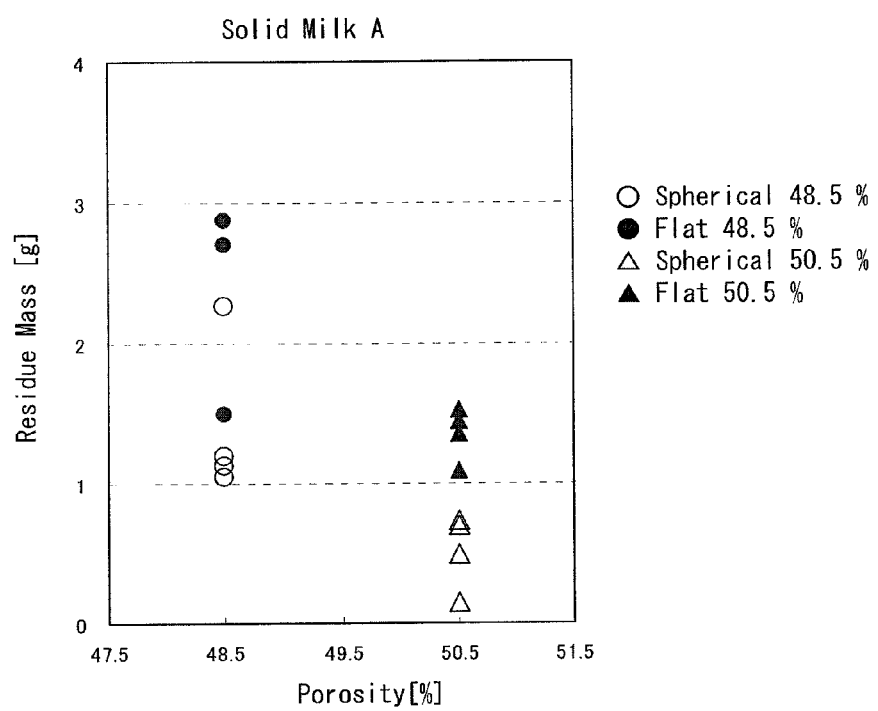
Fig. 16(b)
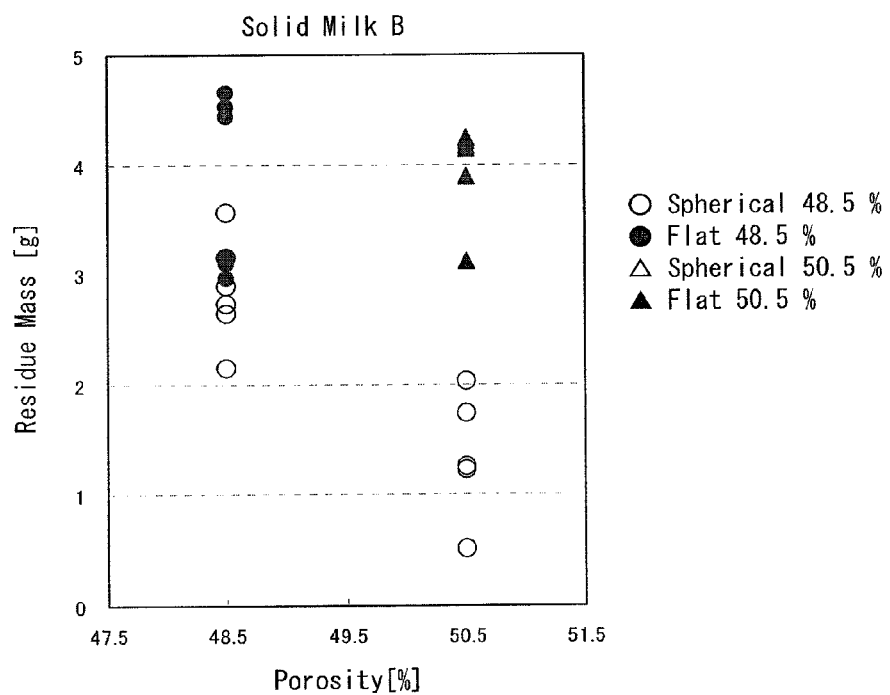

FOOD WITH DEPRESSION

FIELD OF THE INVENTION

The present invention relates to a food product having recesses and more specifically relates to a food product, such as solid milk, having recesses so that it is easily dissolved in water or heated water (which is termed "solubility" hereafter).

BACKGROUND OF THE ART

It is important in designing solid products obtained by molding powder food to give the solid products mechanical strength against shock applied thereto during production and shipping and disintegrating property and solubility in water or in the mouth. In other words, it is ideal for the sold products to be rapidly disintegrated and dissolved while maintaining necessary mechanical strength for various applications and improved convenience of the food product.

In order to improve the solubility of a solid food product, the solid product is small-sized and increased in surface area, additives are included in the food product, or the porosity is increased. When the product is small-sized, it has to be produced in a larger number, leading to increased production cost and difficulty in handling. When additives are included, the taste may be impaired. Furthermore, additives cannot be incorporated in formula milk powder. With regard to the adjustment of porosity, it is not always easy to ensure both the strength and the solubility in various food products.

The Japanese Laid-Open Patent Application Publication (before examination) No. H09-104619 (Patent Document 1 below) discloses a tablet having a recess. The tablet recess is a cleavage line to easily break the tablet. It is not particularly intended to improve the solubility.

The Japanese Laid-Open Patent Application Publication (before examination) No. H08-333236 (Patent Document 2 below) discloses a bath agent having a recess nearly in the form of an inverted truncated cone with a convex curved inner wall. However, the bath agent is not a food product. Furthermore, this bath agent has only one recess in the center of the surface.

Milk powder is a food product having storage stability improved by removing from milk most of the moisture necessary for microorganisms to grow. With the moisture being removed, the milk powder is reduced in volume and weight and is easily transported. Milk powder is highly advantageous in storage stability and transportation. Milk powder is easily dissolved in heated water. However, milk powder has to be measured to an appropriate amount each time it is dissolved in heated water. Milk powder may be scattered when it is measured or removed from a container. So, solid milk formed by solidifying milk powder has been proposed (the Japanese Laid-Open Utility Model Application Publication (before examination) No. S49-130189 (Patent Document 3 below) and Japanese Laid-Open Utility Model Application Publication (before examination) No. S61-118280 (Patent Document 4 below)). However, in practice, it was not to solidify milk powder while ensuring both strength and solubility. Solidified milk powder is easily disintegrated and difficult to handle. Furthermore, solid milk has a smaller surface area and therefore is difficult to dissolve in heated water when compared to milk powder. Therefore, solid milk having a high level of solubility and a specific level of strength is desired.

The Japanese Laid-Open Patent Application Publication (after examination) No. S49-4948 (Patent Document 5 below) discloses "a granulated milk powder." It is recited that "the granulated milk powder has porous inner texture so that it allows water to easily infiltrate and, therefore, is easily disintegrated, dispersed, and dissolved when introduced in heated water." However, "the granulated milk powder" in this publication is a mixture with sugar or glucose and suitably "added to coffee or tea." In other words, it is not made of milk powder only or given to babies instead of breast milk.

REFERENCES

[Patent Document 1] Japanese Laid-Open Patent Application Publication (before examination) No. H09-104619

[Patent Document 2] Japanese Laid-Open Patent Application Publication (before examination) No. H08-333236

[Patent Document 3] Japanese Laid-Open Utility Model Application Publication (before examination) No. S49-130189

[Patent Document 4] Japanese Laid-Open Utility Model Application Publication (before examination) No. S61-118280

[Patent Document 5] Japanese Laid-Open Patent Application Publication (after examination) S49-4948

DISCLOSURE OF THE INVENTION

Problems to be Solved by the Invention

One object of the present invention is to provide a food product, such as solid milk, having excellent solubility while maintaining strength.

Means for Solving the Problems

A problem with solid milk is that it breaks due to force applied to only part of it during the molding process. Therefore, solid milk generally has flat surfaces. Solid milk preferably has a uniform thickness so as to be highly strong. Then, solid milk has parallel and flat top and bottom surfaces. The present invention is basically made based on the finding that specific recesses formed on the surface of such solid milk serve to improve the solubility while maintaining strength, even if the solid milk is in the form of a large piece. For example 1 gram per piece or larger.

The food product of the present invention is a food product (1) to be dissolved in water having a top surface (4) including a flat area (2); a bottom surface (8) including a flat area (6) parallel to the flat area (2) on the top surface; and either one or both of a recess (10) formed on the top surface (4) and a recess (12) formed on the bottom surface (8), wherein when the food product has both the recess (10) formed on the top surface (4) and the recess (12) formed on the bottom surface (8), the total of the largest depth $d_u$ (14) of the recess (10) on the top surface and the largest depth $d_d$ (16) of the recess (12) on the bottom surface is 30% or larger of the thickness w (18) of the food product, and when the food product has either one of the recess (10) formed on the top surface (4) and the recess (12) formed on the bottom surface (8), the largest depth $d_u$ (14) of the recess (10) on the top surface or the largest depth $d_d$ (16) of the recess (12) on the bottom surface is 30% or larger of the thickness w (18) of the food product.

The food product of the present invention, such as solid milk, having the above described recesses has improved solubility while maintaining strength.

The present invention is further made based on the finding in working examples that recesses formed on the top and bottom surfaces at opposed positions with their deepest points staggered to each other serve to dramatically improve the solubility of the food product, such as solid milk.

In a preferred embodiment of the present invention, the food product has both the recess (10) formed on the top surface (4) and the recess (12) formed on the bottom surface (8); the recess (10) on the top surface (4) and the recess (12) on the bottom surface (8) are provided at opposed positions and the deepest point (24) of the recess (10) on the top surface and the deepest point (26) of the recess (12) on the bottom surface (8) that is opposed to the recess (10) on the top surface are provided at staggered positions, not at opposed positions.

As shown in the examples, described later, the recesses provided at opposed positions with their deepest points staggered to each other serve to dramatically improve the solubility.

Another embodiment of the present invention is realized based on the finding that specific recesses improve the solubility while maintaining the hardness even if no flat surfaces are provided in spite of the fact that solid milk usually has flat surfaces due to molding issues. Thus, another preferred embodiment of the present invention is a food product (1) to be dissolved in water wherein the food product (1) either has a recess (10) only on one surface or has a pair of recesses (10, 12) formed at positions symmetrical about the gravity center of the food product; when the food product has the recess (10) only on one surface, the largest depth $d_u$ (14) of the recess (10) is 30% or larger of the thickness w (18) of the food product; and when the food product has a pair of recesses (10, 12) formed at positions symmetrical about the gravity center of the food product, the total of the largest depth $d_u$ (14) of one recess (10) and the largest depth $d_d$ (16) of the other recess (12) is 30% or larger of the thickness w (18) of the food product.

Advantageous Effect of the Invention

The present invention provides a food product, such as solid milk, having excellent solubility while maintaining the strength.

BEST MODE FOR CARRYING OUT THE INVENTION

1. Food Product such as Solid Milk

The solid milk of the present invention is described hereafter with reference to the drawings. FIG. 1 is an illustration showing the basic structure of the solid milk of the present invention. FIG. 1(a) is a top view, FIG. 1(b) is a side view, and FIG. 1(c) is a bottom view. As shown in FIG. 1, the food product of the present invention is basically a food product (1) to be dissolved in water having a top surface (4) including a flat area (2); a bottom surface (8) including a flat area (6) parallel to the flat area (2) on the top surface; and either one or both of a recess (10) formed on the top surface (4) and a recess (12) formed on the bottom surface (8), wherein when the food product has both the recess (10) formed on the top surface (4) and the recess (12) formed on the bottom surface (8), the total of the largest depth $d_u$ (14) of the recess (10) on the top surface and the largest depth $d_d$ (16) of the recess (12) on the bottom surface is 30% or larger of the thickness w (18) of the food product, and when the food product has either one of the recess (10) formed on the top surface (4) and the recess (12) formed on the bottom surface (8), the largest depth $d_u$ (14) of the recess (10) on the top surface or the largest depth $d_d$ (16) of the recess (12) on the bottom surface is 30% or larger (preferably 40% or larger) of the thickness w (18) of the food product.

The term "solubility" means that the solid food product is dissolved in water and the like. In other words, the solid product is disintegrated due to infiltration of water or, depending on the state of water, the solid product forms a solution, suspension, emulsion, slurry, paste, or gel in which the solute is monomolecularly dispersed.

The term "food product to be dissolved in water" means food products to be dissolved in water to drink. Such food products are preferably solid products and have a volume of 1 $cm^3$ or larger. "The food product to be dissolved in water" of the present invention excludes powder products. "The food product to be dissolved in water" includes solid milk, soup cubes, solid seasoning, solid juices, fluid diet cubes, solid nutrition products, and solid jelly (which transforms into jelly after re-hydration). Among such food products, so-called "solid milk" is preferable. The solid milk is formed by solidifying milk powder. "The food product to be dissolved in water" is described hereafter focusing on solid milk. Food products other than solid milk can be produced in a similar manner to solid milk with a proper combination of known production processes.

The term "flat area" does not strictly require a flat area and includes nearly a flat portion. The term "parallel" does not strictly require a parallel state and includes nearly a parallel state.

The "recess" means a recess formed to improve the solubility of food products such as solid milk. The recess usually has a depth of 1 mm or larger. As described later with regard to examples, the total capacity of recesses (10, 12) is preferably 4% or larger and more preferably 6% or larger of the volume of the food product. Preferably, one or two recesses are formed both on the top surface and on the bottom surface. The recess can be in the form of a cleavage line.

FIG. 2 is an illustration showing the basic structure of the food product of the present invention, such as solid milk, having a recess only on the top surface. FIG. 2 (a) is a top view, FIG. 2(b) is a side view, and FIG. 2(c) is a bottom view. As shown here, the recess can be formed only on one surface in the present invention. When the recess is formed only on one surface, the surface has one or two recesses. However, the surface can have three recesses. In such a case, the total capacity of the recesses is preferably 4% or larger and more preferably 6% or larger of the volume of the food product. The recesses can be in various forms such as a hemisphere, truncated cone, quadrangular pyramid, six-sided pyramid, and half cylinder between hemispheres. A suitable form is selected in view of solubility and strength.

FIG. 3 is an illustration showing a food product such as solid milk having two recesses both on the top surface and on the bottom surface. FIG. 3(a) is a top view and FIG. 3(b) is a bottom view. As shown in FIG. 3, the food product (1) in this embodiment has two recesses (10a, 10b) on the top surface (4) at positions symmetrical about the center line (20) of the top surface (4) and two recesses (12a, 12b) on the bottom surface (8) at positions symmetrical about the center line (22) of the bottom surface (8). The center line (20) of the top surface and the center line (22) of the bottom surface are parallel. As shown in FIG. 3, it is preferable that the recess (10) on the top surface (4) and the recess (12) on the bottom surface are provided at opposed positions and the deepest point (24) of the recess (10) on the top surface and the deepest point (26) of the recess (12) on the bottom surface (8) that is opposed to the recess (10) on the top surface are provided at staggered positions, not at opposed positions. Preferably, the solid milk has two recesses (10a, 10b) on the top surface (4) at positions symmetrical about the center line (20) of the top surface (4) and two recesses (12a, 12b) on the bottom surface (8) at positions symmetrical about the center line (22) of the bottom surface (8); the center line (20) of the top surface and the center line (22) of the bottom surface are parallel; the recess (10a) on the top surface (4) and the recess (12a) on the bottom surface (8) are provided at opposed positions; the deepest point (24a) of the recess (10a) on the top surface and the deepest point (26a) of the recess (12a) on the bottom surface (8) that is opposed to the recess (10a) on the top surface are provided at staggered positions, not at opposed positions; the other recess (10b) on the top surface (4) and the other recess (12b) on the bottom surface (8) are provided at opposed positions; and the deepest point (24b) of the other recess (10b) on the top surface and the deepest point (26b) of the other recess (12b) on the bottom surface (8) that is opposed to the other recess (10b) on the top surface are provided at staggered positions, not at opposed positions. The shift between the deepest point (24a) of the recess (10a) on the top surface and the deepest point (26a) of the recess (12a) on the bottom surface (8) that is opposed to the recess (10a) on the top surface or the shift between the deepest point (24b) of the other recess (10b) on the top surface and the deepest point (26b) of the other recess (12b) on the bottom surface (8) that is opposed to the other recess (10b) on the top surface is termed "the shift between the deepest points" hereafter for simplicity. It is desired in the present invention to improve solubility while maintaining strength. Therefore, "the shift between the deepest points" is 20% to 80% and preferably 30% to 70% of the length of the recess. "The shift between the deepest points" is 0.2 L to 0.7 L and can be 0.3 L to 0.5 L and even 0.3 L to 0.4 L where L is the length of the food product in the direction that the shift occurs (the length of the center line 22 in FIG. 3).

The food product can be those having no flat surfaces or having curved surfaces, which is not particularly depicted. More specifically, the food product can be a food product (1) to be dissolved in water wherein the food product (1) either has a recess (10) only on one surface or has a pair of recesses (10, 12) formed at positions symmetrical about the gravity center of the food product; when the food product has the recess (10) only on one surface, the largest depth $d_u$ (14) of the recess (10) is 30% or larger of the thickness w (18) of the food product; and when the food product has the pair of recesses (10, 12) formed at positions symmetrical about the gravity center of the food product, the total of the largest depth $d_u$ (14) of one recess (10) and the largest depth $d_d$ (16) of the other recess (12) is 30% or larger of the thickness w (18) of the food product.

Food products having the above forms can have certain levels of strength and solubility because of the recesses. The largest depth of the recess is measured from the base of the recess to the deepest point. The thickness of the food product is the diameter when the food product is spherical. Generally, the distance between the plane on which the food product is placed in the most stable manner and the highest point of the food product is defined as the thickness of the food product.

Preferred food products are in the form of a sphere, rugby ball, ellipsoid, or oval. The surface having the recess (10) is in the upper hemisphere or in the lower hemisphere.

The food product of the present invention, such as solid milk, is not particularly restricted in form as long as it has certain magnitudes of measurements. The solid milk can be in the form of a cylinder, elliptic cylinder, cube, rectangular parallelepiped, plate, sphere, polygonal prism, polygonal pyramid, polygonal truncated pyramid, or polyhedron. The form of a cylinder or quadratic prism is preferable in view of easy transportation. Preferably, the solid milk and other products have beveled corners in order to prevent breaking. They can be in the form of a sphere, rugby ball, ellipsoid, or oval. The form of a disc (cylinder) may not look cute. However, the food products such as solid milk in a form having curved surfaces may look cute. The food product such as solid milk can be produced by compression molding, wet formula, or freeze drying. Pestles or molds having the tip appropriately adjusted can be used to obtain solid milk in any form.

The solid milk of the present invention is solid milk preferably having a porosity of 30% to 60% (not lower than 30% and not higher than 60%). Solubility is improved and strength is lowered as porosity is increased. Solubility is lowered as porosity is reduced. Porosity is determined by the compressing force during the compression process. Porosity in the present invention can be 35% to 50%. Porosity is adjusted according to applications and can be 30% to 35%, 30% to 45%, 40% to 45%, or 40% to 50%. The porosity, fat content in the raw materials, moisture content, compressing force, compressing speed, compression holding time (time for holding the maximum compression stroke), free fat rate, moisturizing condition, and drying condition can appropriately be adjusted to obtain solid milk having excellent solubility and strength even given high porosity. The porosity of the solid milk of the present invention is preferably higher than 50% and not higher than 65%. It can be higher than 50% and not higher than 60%, higher than 50% and lower than 60%, higher than 50% and not higher than 58%, or higher than 50% and not higher than 55%. The porosity further can be 55% to 65%, 55% to 60%, or 55% to 58%. With the porosity being adjusted within the above ranges, excellent solid milk free from problems including oil-off as described later can be obtained. The term "porosity" means the ratio of void to volume in a powder mass volume (for example, see "Development of Pharmaceutical Products" edited by Koichiro Miyajima (Vol. 15), published by Hirokawa-shoten, (1989), page 240). More specifically, porosity means the measurements of the solid milk obtained by the porosity determination in exemplary experiments described later.

Preferably, the solid milk has multiple voids. Voids (pores) are preferably uniformly scattered. Uniformly scattered voids throughout the solid milk serve to yield a higher level of solubility. Larger voids allow water to easily infiltrate, leading to a readily soluble product. On the other hand, when the voids are excessively large, the strength is impaired or the solid milk has a rough surface. Then, the voids are preferably 10 μm to 500 μm and more preferably 50 μm to 300 μm in size. The void size can be measured by a known technique, for example by observing the surface and cross-section of the solid milk under a scanning electron microscope.

The solid milk basically includes the same ingredients as milk powder used as the raw material except for the moisture content. The solid milk ingredients include fat, sugar, proteins, minerals, and moisture.

The fat content of the solid milk is for example 5% by weight to 70% by weight, preferably 5% by weight to 50% by weight, and more preferably 10% by weight to 45% by weight.

The solid milk of the present invention can contain emulsified fat and free fat as fat ingredients. In other words, the conventional milk powder and solid milk proactively exclude free fat because it impairs the taste and floats to the surface when dissolved in heated water (oil-off). The solid milk of the present invention preferably proactively includes such free fat. The free fat is effectively used in place of the shape retaining agent. The present invention provides solid milk excellent in solubility and strength without using additives. However, when the free fat is excessively included, the oil-off issue occurs. The solid milk of the present invention has a free fat content of 0.5% by weight to 4% by weight, preferably 0.7% by weight to 3% by weight, and more preferably 1% by weight to 2.5% by weight. These ranges yield preferable hardness and solubility and prevent an excessive of the oil-off phenomenon. The amount of free fat at which the oil-off can be problematic varies depending on physical properties such as fat composition and fat globule diameter in the milk powder used as the raw material. The amount of free fat in the solid milk can be appropriately adjusted within the above ranges. Solid milk having a high porosity and a certain level of hardness can be obtained for the same raw material when a lower compression speed (the moving speed of the pestle of the compression molding unit, which is calculated by dividing the compression stroke by the compression time) is used. When the solid milk is produced in such a manner, it tends to contain more free fat compared to the raw material. Therefore, the present invention can contain more free fat than the conventional solid milk.

The solid milk has low storage stability when it contains a large amount of moisture. The solid milk is brittle when it contains a small amount of moisture. The moisture content of the solid milk is 1% by weight to 5% by weight and preferably 2% by weight to 3.5% by weight.

The solid milk of the present invention has one or more recesses on the surface.

Preferably, one to several pieces of solid milk (preferably one piece of solid milk) of the present invention is dissolved in heated water to obtain one serving of milk to drink. Thus, the volume of the solid milk is 1 cm$^3$ to 50 cm$^3$, preferably 2 cm$^3$ to 30 cm$^3$, and more preferably 3 cm$^3$ to 20 cm$^3$.

The solid milk of the present invention has to have a certain level of solubility. The solubility is evaluated by using proper stirring conditions and test solution temperature depending on the types of solid milk to be evaluated and applications. The solid milk of the present invention preferably yields 80% or less insoluble residue of those having no recess under the solubility measurement conditions described later. The solubility of the solid milk can be 85% or lower or 90% or lower compared to those having no recess.

The solid milk of the present invention preferably has a certain level of strength in order to prevent disintegration due to shock applied to the solid product during the production or shipping or to eliminate excessive wrapping for preventing disintegration of the solid product. More specifically, the solid milk of the present invention preferably has a strength of 20 N or higher under the hardness (tablet hardness) measurement conditions described later. On the other hand, in view of solubility, the solid milk having a hardness of 300 N or lower is preferable. The hardness of the solid milk can be 30 N to 200 N or 50 N to 100 N.

2. Production Process

The method of producing the solid milk of the present invention includes a compression step for compressing milk powder to obtain solid, compressed milk powder, a moisturizing step for moisturizing the compressed milk powder obtained in the compression step, and a drying step for drying the compressed milk powder moisturized in the moisturizing step.

2.1. Compression Step

The compression step is a step for compressing milk powder to obtain solid, compressed milk powder. In the compression step, the milk powder is compressed under a relatively low pressure to the extent that it can be transferred to the next step so as to obtain compressed milk powder ensuing voids in which water infiltrates. In the compression step, the milk powder is compressed to meet the requirement that compressed milk powder having proper voids and shape retaining property is produced. The porosity after the compression step closely relates to the porosity of the solid milk. On the other hand, if the compressed milk powder is poorly lubricated, the compressed milk powder may partly adhere to the equipment such as the molding unit. If the compressed milk powder has low shape retaining property, the shape may not be retained during the production of solid milk.

The raw material in the compression step is preferably only milk powder and substantially no additives are used. The milk powder can be those commercially available or produced by a known method (for example the production methods described in the Japanese Laid-Open Patent Application Publication (before examination) Nos. H10-262553, H11-178506, 2000-41576, 2001-128615, 2003-180244, and 2003-245039). The composition of the milk powder includes the same composition as the above solid milk. Fat can be added to the raw material in the compression step. However, with the addition of fat, the fat may cause the oil-off. The added fat adheres to the surface of the milk powder, lowering the accuracy of loading to the mortar. Therefore, it is preferable to use, in the compression step, milk powder produced with a targeted level of free fat.

A small compressing force can be used when the milk powder has a low fat content. On the other hand, a larger compressing force should be used when the milk powder has a high fat content. Thus, the milk powder having a higher fat content easily satisfies the requirement that compressed milk powder having proper voids and shape retaining property is produced. In this respect, the fat content of the milk powder is 5% by weight to 70% by weight, preferably 5% by weight to 50% by weight, and more preferably 10% by weight to 45% by weight.

The milk powder preferably contains free fat as described above. The free fat is effectively used in the present invention in place of a shape retaining agent. In this way, a preferred embodiment of the present invention provides excellent solid milk without additives. The free fat content of the solid milk of the present invention is 0.5% by weight to 3% by weight, preferably 0.7% by weight to 2.4% by weight, and more preferably 1% by weight to 2% by weight.

The milk powder with a high moisture content leads to poor storage stability and the milk powder with a low moisture content leads to brittleness (poor shape retaining property). Thus, the moisture content of the milk powder is 1% by weight to 5% y weight and preferably 2% by weight to 3.5% by weight.

In the compression step, compressed milk powder is produced using a compressing means for compressing milk powder to obtain solid, compressed milk powder. The compressing means is not particularly restricted as long as it can compress milk powder to obtain solid, compressed milk powder. The compressing means includes compression molding units such as known tableting machines and compression test units. The compression means is preferably a tableting machine. The tableting machine includes those described in the Japanese Laid-Open Patent Application Publication (after examination) No. S33-9237, Japanese Laid-Open Patent Application Publication (before examination) Nos. S53-59066, H06-218028, and 2000-95674, and Japanese Patent Publication No. 2650493.

Since the solid milk of the present invention has a specific recess on the surface, a molding unit provided with a projection corresponding to the recess at the pestle tip or in the mold is preferably used.

When a compression molding unit is used to compress powder, for example, the powder is introduced in a mortar and hit by a pestle to apply a compressing force to the powder for solidifying it. Here, if the powder is poorly lubricated, the powder adheres to the surface of the pestle. This not only adversely affects the product quality but also requires cleaning of the pestle surface, lowering the operation availability. Therefore, lubricants are added in practice, particularly in producing medical drugs. However, lubricants are not easily dissolved in water. Therefore, it is not desirable to add lubricants to the product to be dissolved in heated water to drink such as solid milk. This is one of the factors that make the production of solid milk difficult. The present invention uses a proper amount of free fat as a shape retaining agent to prevent the milk powder from adhering to the pestle as described above although it has been desirable in the prior art that the free fat is present at a rate as low as possible. Furthermore, as described above, obtaining compressed milk powder having a proper porosity leads to solid milk having high solubility and excellent shape retaining property. When disintegrators are added, precipitates are observed. Disintegrators are unnecessary in the method of producing the solid milk of the present invention and such an event is prevented.

The ambient temperature in the compression step is not particularly restricted and can be room temperature. More specifically, the ambient temperature in the compression step is 10° C. to 30° C. The humidity in the compression step is for example 30% RH to 50% RH. The compression operation of milk powder is preferably performed in a continuous manner in the compression step.

When a low compression speed (the moving speed of the pestle of the compression molding unit) is used in the compression step, solid milk having a high porosity and a certain level of hardness can be obtained although it takes time to solidify the milk powder. On the other hand, when a high compression speed is used, the production performance to solidify the milk powder is increased; however, it is difficult to obtain solid milk having the hardness maintained. In this regard, the compression speed of the tableting machine is 0.1 mm/s to 100 mm/s, preferably 0.5 mm/s to 40 mm/s, more preferably 2 mm/s to 20 mm/s, and further preferably 3 mm/s to 10 mm/s. When the porosity is high (for example a porosity of higher than 50%), a certain level of hardness is maintained and the solubility is improved at a compression speed of 0.1 mm/s to 40 mm/s. On the other hand, when the porosity is low (for example a porosity of 50% or lower), a certain level of hardness is maintained and a certain level of solubility is achieved at a compression speed of approximately 100 mm/s. It takes much time to produce solid milk at a low compression speed. However, low compression speeds are preferable because solid milk having a high porosity while maintaining the hardness is obtained as described above. The compressing force of the compression molding unit is 50 kPa to 30 MPa, preferably 0.1 MPa to 10 MPa, more preferably 0.1 MPa to 8 MPa, further preferably 0.1 MPa to 5 MPa, further more preferably 0.1 MPa to 3 MPa, and particularly preferably 0.1 MPa to 1 MPa. The compressing force can be 1 MPa or larger or 2 MPa or larger in view of reduced production time. The compressing force is a pressure per unit area applied to the powder layer at the maximum compression stroke, which can be measured by a commercially available load cell. The compression stroke and compression time are not particularly restricted and can be 2 mm to 4 mm and 0.3 sec to 1 sec, respectively.

When a single axis reciprocating tableting machine, such as a single punch tableting machine, is used as the compression molding unit in order to achieve the above compression speed, the moving speed of the reciprocating pestle can be adjusted. When the compression molding unit is a rotary type tableting machine, the rotation number can be adjusted to control the moving speed of the pestle.

In a preferred embodiment of the present invention, a compression holding time (the duration of the maximum compression stroke being held) is set in the compression step. Even if it is small, a certain length of compression holding time serves to lower the porosity and improve the hardness of the obtained solid milk compared to the case with no compression holding time. Therefore, for example, 0.1 sec to 1 min, preferably 0.1 sec to 30 sec, more preferably 0.1 sec to 5 sec, and further preferably 0.1 sec to 2 sec of compression holding time is set in order to obtain solid milk having a high level of hardness. When the compression holding time is long, it takes more time to produce the solid milk. However, as described above, solid milk having a proper porosity and maintaining the hardness can preferably be obtained.

2.2 Moisturizing Step

The moisturizing step is a step for moisturizing the compressed milk powder obtained in the compression step. The compressed milk powder is moisturized to partially melt and cross-link particles near the surface of the compressed milk powder, thereby increasing the strength near the surface of the compressed milk powder.

In the moisturizing step, the compressed milk powder is moisturized using a moisturizing means for moisturizing the compressed milk powder. The moisturizing means can be a known moisturizing means such as a high humidity chamber, spray, and steam. The moisturizing technique can be a known moisturizing technique such as placing in a high humidity environment, spraying with water, and placing in a stream of steam. The humidity in a high humidity environment is for example 60% RH to 100% RH, preferably 80% RH to 100% RH, and more preferably 90% RH to 100% RH. The time to place in a high humidity environment is for example 5 sec to 1 hour, preferably 10 sec to 20 min, and more preferably 15 sec to 15 min. The moisturizing time is appropriately adjusted according to humidity, temperature, and physical properties required for the solid milk. The moisturizing time can be for example 1 min to 15 min, 1 min to 5 min, 5 min to 15 min, or 5 min to 10 min. The temperature in placing in a high humidity environment is for example 30° C. to 100° C. and preferably 40° C. to 80° C. Higher humidity and higher temperatures serve to shorten the operation time of the moisturizing step. Using a specific range of moisturizing time improves the hardness of the obtained solid milk.

The amount of moisture added to the compressed milk powder in the moisturizing step (which is termed "the moisturizing rate" hereafter) is appropriately adjusted. The present invention basically uses only milk powder as the raw material; therefore, the moisturizing rate is preferably within the following range. The hardness is increased when the moisturizing rate is 0.5%. The hardness is approximately doubled when the moisturizing rate is 1%. As just described, the hardness tends to be increased as the moisturizing rate is increased. On the other hand, no increase in hardness is observed when the moisturizing rate is 2.5% and above. The compressed milk powder is dissolved and some deformation or adhesion to the equipment during the transfer is observed when the moisturizing rate exceeds 3%. Then, the amount of moisture added to the compressed milk powder is preferably 0.5% to 3% and more preferably 1% to 2.5% based on the mass of the compressed milk powder.

2.3. Drying Step

The drying step is a step for drying the compressed milk powder moisturized in the moisturizing step. In the drying step, the compressed milk powder moisturized in the moisturizing step is dried to remove the surface tackiness, whereby the solid milk can be treated as a final product. The drying technique in the drying step can be a known technique for drying the compressed milk powder moisturized in the moisturizing step, such as placing under low humidity and high temperature conditions and contacting with dry air or hot dry air.

The "humidity" in placing under low humidity and high temperature conditions is 0% RH to 30% RH, preferably 0% RH to 25% RH, and more preferably 0% RH to 20% RH. As just described, the humidity is preferably as low as possible. The "temperature" in placing under low humidity and high temperature conditions is 20° C. to 150° C., preferably 30° C. to 100° C., and more preferably 40° C. to 80° C. The "drying time" in placing under low humidity and high temperature conditions is 0.2 min to 2 hours, preferably 0.5 min to 1 hour, and more preferably 1 min to 30 min.

As described above, the solid milk has poor storage stability when it contains a large amount of moisture and the solid milk is brittle when it contains a small amount of moisture. In the drying step, it is preferable to control the moisture content of the solid milk for within plus/minus 1% (preferably within plus/minus 5%) of the moisture content of the milk powder used as the raw material.

3. Method of Producing Milk Powder and Solid Milk

The method of producing milk powder and solid milk of the present invention includes a step of producing milk powder and a step of producing solid milk using the milk powder as the raw material. Here, part of the milk powder produced in the step of producing milk powder can be introduced in a container as it is to obtain a final product. In this way, milk powder and solid milk can be obtained.

3.1. Method of Producing Milk Powder

The method of producing milk powder varies in detail depending on the types of products including whole milk powder, skim milk powder, and formula milk powder, typically baby milk powder. However, milk powder can basically be produced in the steps of "(adjusting) raw material, clarifying, sterilizing, condensing, (homogenizing), spray-drying, screening, and packaging." The spray-dried milk powder is approximately 5 µm to 150 µm in size and the granulated milk powder is approximately 100 µm to 500 µm in size. A mixture of milk powder and its granulated product includes voids of approximately 5 µm to 150 µm.

The raw materials of milk powder include milk. The milk includes raw milk. More specifically, the milk includes milk from cow (Holstein, Jersey, and others), goat, sheep, and buffalo. Fat is partly removed from the milk for example by centrifugal separation to control the fat content. Furthermore, the nutrients below can be added. On the other hand, the nutrients below are added to and mixed with water for use in order to produce formula milk powder.

The above raw material solution is subject to the known production processes, "clarifying," "sterilizing," "homogenizing," "condensing," "spray-drying," "screening," and "packaging," to produce milk powder.

Proteins used as ingredients of milk powder include milk proteins and milk protein fractions such as casein, whey proteins (such as α-lactalbumin and β-lactoglobulin), whey protein concentrates (WPC), and whey protein isolates (WPI); animal proteins such as egg protein; vegetable proteins such as soy protein and wheat protein; peptides of different chain lengths from these proteins decomposed by enzymes; and amino acids such as taurine, cystine, cysteine, arginine, and glutamine, which can be used individually or in combination.

Fats and oils used as ingredients of milk powder include animal fats such as milk fat, lard, beef tallow, and fish oil and vegetable oils such as soy oil, rapeseed oil, corn oil, coconut oil, palm kernel oil, sunflower oil, cottonseed oil, flaxseed oil, and MCT, or their fraction oils, hydrogenated oils, and transesterified oils, which can be used individually or in combination.

Sugar used as ingredients of milk powder include milk sugar, sucrose, glucose, and maltose, and oligosaccharides such as galactoligosaccharide, fluctoligosaccharide, and lactulose, polysaccharides such as starch, soluble polysaccharide, and dextrine, and artificial sweetener, which can be used individually or in combination.

Furthermore, water-soluble or lipid-soluble vitamins, minerals, fragrances, and flavoring substances can be additionally used as ingredients of milk powder.

3.1.1. Clarifying Step

The clarifying step is a step for removing fine foreign substances contained in milk using a known means such as centrifugal separation and filtering.

3.1.2. Sterilizing Step

The sterilizing step is a step for killing microorganisms such as bacteria contained in milk. The sterilizing temperature and time in the sterilizing step varies depending on the type of powdered milk. Conditions used in known sterilizing treatments can be used.

3.1.3. Condensing Step

The condensing step is an optional step for preliminary condensing milk before the spray-draying step described later. Known means and conditions, such as vacuum evaporator, can be used.

3.1.4. Homogenizing Step

The homogenizing step is an optional step for homogenizing solid ingredients dispersed in milk, such as fat globules, to a specific size or smaller. Known means and conditions, such as applying a high pressure to the processing solution and passing it through a narrow opening, can be used.

3.1.5. Spray-Dying Step

The spray-drying step is a step for evaporating moisture in the condensed milk to obtain powder. Known means and conditions, such as a spray-drier, can be used.

3.1.6. Screening Step

The screening step is a step for screening the powder obtained in the spray-drying step to remove large clots such as agglomerated powder for granulation.

3.1.7. Packaging Step

The packaging step is a step for packaging the milk powder in bags or cans.

In the method of producing milk powder and solid milk of the present invention, the method of producing solid milk described above is used after the milk powder is produced as described above. In other words, the above described compression step is performed using the milk powder obtained in the screening step as the raw material.

4. Applications of Solid Milk

The solid milk of the present invention is usually dissolved in heated water to drink. More specifically, a container with a lid is filled with heated water and a necessary number of pieces of solid milk of the present invention are introduced therein. Preferably, the container is shaken well to rapidly dissolve the solid milk. The milk at a proper temperature is drunk

[Experiment 1 (Solubility Measurement)]

The solubility of the solid milk was measured as follows. Two pieces of solid milk in different forms were introduced in an infant-feeding bottle. Heated water that is a test liquid was added to a volume of 80 mL. The bottle was allowed to stand for 10 sec. Then, the bottle was gently shaken by moving it in a circular pattern by hand at a speed of four rotations per sec for five sec. Immediately after the bottle was shaken, the whole solution was screened using a sieve (32 meshes) of which the mass is known. Extra moisture was wiped off without making contact with the residue on the sieve. Then, the sieve mass (g) after the screening was measured. The difference in mass of the sieve before and after the screening was considered to be a residue mass (g). The solubility was assumed to be high where the residue mass was small.

[Experiment 2 (Hardness Measurement)]

The hardness (tablet hardness) of the solid milk was measured by a harness tester (Okada Seiko). A load is applied to samples in the direction that the fracture cross-section has the smallest area. The load at fracture was determined.

[Experiment 3 (Solid Milk Porosity Measurement)]

The porosity of the solid milk was obtained by the following expression:

$$\text{Porosity (\%)} = (1 - W/PV) \times 100$$

W: weight of solid milk (g);
P: density of solid ingredients measured by a Beckmann air densimeter (g/cm$^3$);
V: volume of solid milk calculated from the thickness measured by a micrometer and the pestle shape (cm$^3$).

(Exemplary Production 1)

A mixture prepared by adding sugar, proteins, milk, and minerals to water was homogenized, condensed, and spray-dried to obtain "milk powder A" (protein 12 g, fat 26 g, sugar 57 g per 100 g of ingredients) and "milk powder B" (protein 15 g, fat 18 g, sugar 60 g per 100 g of ingredients). The milk powder was compress molded in a single punch tableting machine (Okada Seiko) or compression molding unit for a compression time of approximately one second. Then, the milk powder was allowed to stand in a thermo-hygrostat (TABAI ESPEC) at 65° C. and 100% RH for 60 sec, which was followed by drying in an air oven (Yamato Science) at 80° C. for 5 to 7 min. In this way, the solid milk products having the forms shown in FIGS. 4 to 10 and a weight of approximately 5.4 g to 5.6 g were produced.

FIG. 4 shows solid milk of a flat (regular) type as a reference example having the center line. The center line is formed as a cleavage line for adjusting the volume of the solid milk. FIG. 5 shows solid milk of a spherical type having hemispherical recesses. In FIG. 5, two hemispherical recesses are formed both on the top surface and on the bottom surface. However, the present invention is not restricted thereto. The hemispherical recesses can be formed only on the top surface or on the bottom surface. Furthermore, only one or three, not two, hemispherical recesses can be formed on both sides. The hemispherical shape is not necessarily an exact hemisphere. A hemisphere of latitudes from 20° to 90° or latitudes from 45° to 70° can be used.

FIG. 6 shows solid milk of a shallow trapezoidal type having shallow trapezoidal recesses. In FIG. 6, two trapezoidal recesses are formed both on the top surface and on the bottom surface. However, the present invention is not restricted thereto. The trapezoidal recesses can be formed only on the top surface or on the bottom surface. Furthermore, only one or three, not two, trapezoidal recesses can be formed on both sides. In place of trapezoidal recesses, quadrangular pyramid or triangular prism recesses can be formed. Specific values of the angles of gradient, capacity, and R treatment at the corners of the recesses are not restricted to those shown in the figure and can appropriately be adjusted.

FIG. 7 shows solid milk of a deep trapezoidal type having deep trapezoidal recesses. In FIG. 7, two trapezoidal recesses are formed both on the top surface and on the bottom surface. However, the present invention is not restricted thereto. The trapezoidal recesses can be formed only on the top surface or on the bottom surface. Furthermore, only one or three, not two, trapezoidal recesses can be formed on both sides. In place of trapezoidal recesses, quadrangular pyramid or triangular prism recesses can be formed. Specific values of the angles of gradient, capacity, and R treatment at the corners of the recesses are not restricted to those shown in the figure and can appropriately be adjusted.

FIG. 8 shows solid milk of a propeller type in which the deepest points of the opposed recesses are provided at staggered positions. In FIG. 8, two rectangular recesses are formed both on the top surface and on the bottom surface. However, the present invention is not restricted thereto. The rectangular recesses can be formed only on the top surface or on the bottom surface. The shape of the recesses is not particularly restricted. For example, the recesses can be in the form of a hemisphere, trapezoid, pyramid, or prism. Furthermore, only one or three, not two, rectangular recesses can be formed on both sides. Specific values of the angles of gradient, capacity, and R treatment at the corners of the recesses are not restricted to those shown in the figure and can appropriately be adjusted.

FIG. 9 shows solid milk of a shallow pit type. FIG. 10 shows solid milk of a deep pit type. In FIGS. 9 and 10, two recesses in the form of a half cylinder between hemispheres are formed both on the top surface and on the bottom surface. However, the present invention is not restricted thereto. The recesses can be formed only on the top surface or on the bottom surface. Furthermore, only one or three, not two, recesses can be formed on both sides. Specific values of the cylinder length, capacity, and R treatment at the corners of the recesses are not restricted to those shown in the figure and can appropriately be adjusted.

The solid milk obtained from "the milk powder A" is called "the solid milk A" and the solid milk obtained from "the milk powder B" is called "the solid milk B" in examples below.

EXAMPLE 1

Improvement in Solubility of Solid Milk

Different types of solid milk were produced and improvement in solubility of the solid milk was studied. FIG. 11 shows the results obtained. FIG. 11 is a graphical representation showing the shape and recess capacity (cm$^3$) of solid milk ("the solid milk A" had a weight of 5.4 g and "the solid milk B" had a weight of 5.6 g) and the insoluble residue of solid milk. FIGS. 11(a) and (b) show the results of solubility measurement in which "the solid milk A" and "the solid milk B" had a porosity of 48% and the temperature of the test liquid used with the solid milk was 50° C. However, the spherical types had a porosity of 48.5%. Two pieces of solid milk of different types were introduced in an infant-feeding bottle and heated water at 50° C. as a test liquid was added to 80 mL. The bottle was allowed to stand for 10 sec. Then, the bottle was gently shaken by moving it in a circular pattern by hand at a speed of four rotations per sec for five sec. Immediately after the bottle was shaken, the whole solution was screened using a sieve (32 meshes) of which the mass is known. Extra moisture was wiped off without making contact with the residue on the sieve. Then, the sieve mass (g) after the screening was measured. The difference in mass of the sieve before and after the screening was considered to be a residue mass (g). The solubility was assumed to be high where the residue mass was small. In the figure, the flat type means the regular type.

It is understood from FIG. 11 that the recesses serve to dramatically improve the solubility of solid milk. The spherical, deep trapezoidal, propeller and deep pit types of solid milk particularly exhibited excellent solubility. With regard to the solid milk B, the spherical type was dissolved well. This was presumably because a different compression method was used from the other types and the spherical type had a higher porosity of 48.5%. Here, assuming that the overall porosity of solid milk was approximately 40% to 50%, the volume was not smaller than 7 cm$^3$ and not larger than 9 cm$^3$. For example, when the porosity was approximately 40%, the volume was approximately 7 cm$^3$ to 7.5 cm$^3$. When the porosity was approximately 45%, the volume was approximately 7.7 cm$^3$ to 8.2 cm$^3$. When the porosity was approximately 50%, the volume was approximately 8.5 cm$^3$ to 9 cm$^3$. The total capacities of the spherical, deep trapezoidal, shallow trapezoidal, propeller, shallow pit, and deep pit recesses are 0.339 cm$^3$, 0.637 cm$^3$, 0.534 cm$^3$, 1.042 cm$^3$, 0.429 cm$^3$, and 0.638 cm$^3$, respectively. These results show that solid milk having a porosity of approximately not lower than 45% and not higher than 50% and spherical recesses is preferable when the solid milk is dissolved in heated water. In such a case, the capacity of the recesses is preferably 4% or higher of the volume of the food product. On the other hand, when the recesses are not in the form of a sphere, for example, in the form of a trapezoid, the capacity of the recesses is preferably 6% or higher of the volume of the food product. Furthermore, the recesses having the deepest points at staggered positions such as the propeller type exhibited a preferable solubility.

EXAMPLE 2

Improvement in Solubility of Solid Milk

A total of 5.4 g of "the milk powder A" was compression molded in a compression molding unit to a porosity of 48%, moisturized in a steam oven at 65° C. and 100% RH for 60 sec, and dried in an air thermostatic chamber at 85° C. for 5 min to obtain "the solid milk A" of different types. A total of 5.6 g of "the milk powder B" was compression molded in a compression molding unit to a porosity of 48%, moisturized in a steam oven at 65° C. and 100% RH for 60 sec, and dried in an air thermostatic chamber at 85° C. for 7 min to obtain "the solid milk B" of different types.

FIG. 12 shows the results obtained. FIG. 12 is a graphical representation showing the shape and recess largest depth (mm) of solid milk ("the solid milk A" had a weight of 5.4 g and "the solid milk B" had a weight of 5.6 g) and the insoluble residue (g) of solid milk. FIGS. 12(a) and (b) show the results of solubility measurement in which "the solid milk A" and "the solid milk B" had a porosity of 48% and the temperature of the test liquid used with the solid milk was 50° C.

It is understood from FIG. 12 that the recesses serve to dramatically improve the solubility of solid milk. The spherical, deep trapezoidal, propeller and deep pit types of solid milk particularly exhibited excellent solubility. With regard to the solid milk B, the spherical type was dissolved well. This was presumably because a different compression method was used from the other types and the spherical type had a higher porosity of 48.5%. Here, assuming that the overall porosity of solid milk was approximately 40% to 50%, the thickness was not smaller than 10 mm and not larger than 15 mm. For example, when the porosity was approximately 40%, the volume was approximately 10 mm to 12.5 mm. When the porosity was approximately 45%, it was approximately 11.2 mm to 13 mm. When the porosity was approximately 50%, it was approximately 12.4 mm to 15 mm. The largest depths of the spherical, deep trapezoidal, shallow trapezoidal, propeller, shallow pit, and deep pit recesses are 3 mm, 4 mm, 2 mm, 5 mm, 2.67 mm, and 4 mm, respectively.

EXAMPLE 3

Forms and Solubility

A total of 5.4 g of "the milk powder A" was compression molded in a compression molding unit to a porosity of 46% or 48%, moisturized in a steam oven at 65° C. and 100% RH for 60 sec, and dried in an air thermostatic chamber at 85° C. for 5 min to obtain "the solid milk A." A total of 5.6 g of "the milk powder B" was compression molded in a compression molding unit to a porosity of 48%, moisturized in a steam oven at 65° C. and 100% RH for 60 sec, and dried in an air thermostatic chamber at 85° C. for 7 min to obtain "the solid milk B." "The solid milk A" and "the solid milk B" were shaped into the flat (regular) and deep pit types. Assuming that the overall porosity of the solid milk was approximately 40% to 50%, the volume was not smaller than 7 cm$^3$ and not larger than 9 cm$^3$ and the thickness was not smaller than 10 mm and not larger than 15 mm. For example, "the solid milk A" having a porosity of 46% and 48% had a volume of 8.197 cm$^3$ and 8.512 cm$^3$, respectively. "The solid milk B" having a porosity of 48% had a volume of 8.615 cm$^3$. The flat "solid milk A" having a porosity of 46% and 48% had a thickness of 11.61 mm and 12.05 mm, respectively. The flat "solid milk B" having a porosity of 48% had a thickness of 12.19 mm. The deep pit "solid milk A" having a porosity of 46% and 48% had a thickness of 12.49 mm and 12.93 mm, respectively. The deep pit "solid milk B" having a porosity of 48% had a thickness of 13.07 mm. The total capacity of the deep pit recesses was 0.638 cm$^3$ and the largest depth was 4 mm.

FIG. 13 shows the results obtained. FIG. 13 is a graphical representation showing the shape of solid milk and the insoluble residue of solid milk. FIGS. 13(a) and (b) show the results of solubility measurement in which "the solid milk A" had a porosity of 46% or 48%, "the solid milk B" had a porosity of 48%, and the test liquid temperature was 50° C. It is understood from FIG. 13 that the recesses serve to improve the solubility.

EXAMPLE 4

A total of 5.4 g of "the milk powder A" was compression molded in a compression molding unit to a porosity of 48%, moisturized in a steam oven at 65° C. and 100% RH for 60 sec, and dried in an air thermostatic chamber at 85° C. for 5 min to obtain "the solid milk A." A total of 5.6 g of "the milk powder B" was compression molded in a compression molding unit to a porosity of 48%, moisturized in a steam oven at 65° C. and 100% RH for 60 sec, and dried in an air thermostatic chamber at 85° C. for 7 min to obtain "the solid milk B." "The solid milk A" and "the solid milk B" were shaped into the flat (regular) and shallow pit types. Here, assuming that the overall porosity of the solid milk was approximately 40% to 50%, the volume was not smaller than 7 cm$^3$ and not larger than 9 cm$^3$ and the thickness was not smaller than 10 mm and not larger than 15 mm. For example, the solid milk A having a porosity of 48% had a volume of 8.512 cm$^3$. The solid milk B having a porosity of 48% had a volume of 8.615 cm$^3$. The shallow pit solid milk A having a porosity of 48% had a thickness of 12.64 mm. The shallow pit solid milk B having a porosity of 48% had a thickness of 12.78 mm. The flat solid milk A having a porosity of 48% had a thickness of 12.05 mm. The flat solid milk B having a porosity of 48% had a thickness of 12.19 mm. The total capacity of the shallow pit recesses was 0.429 cm³ and the largest depth of the recesses was 2.67 mm.

FIG. 14 shows the results obtained. FIG. 14 is a graphical representation showing the shape of solid milk and the insoluble residue of solid milk. FIGS. 14(a) and (b) show the results of solubility measurement in which "the solid milk A" and "the solid milk B" had a porosity of 48% and the test liquid temperature was 50° C. It is understood from FIG. 14 that the recesses serve to improve the solubility.

EXAMPLE 5

A total of 5.4 g of "the milk powder A" was compression molded in a compression molding unit to a porosity of 48% or 50%, moisturized in a steam oven at 65° C. and 100% RH for 60 sec, and dried in an air thermostatic chamber at 85° C. for 5 min to obtain "the solid milk A." A total of 5.6 g of "the milk powder B" was compression molded in a compression molding unit to a porosity of 48% or 50%, moisturized in a steam oven at 65° C. and 100% RH for 60 sec, and dried in an air thermostatic chamber at 85° C. for 7 min to obtain "the solid milk B." "The solid milk A" and "the solid milk B" were shaped into the flat (regular), shallow trapezoidal, deep trapezoidal, propeller, and granular (not solid) types. Here, assuming that the overall porosity of the solid milk was approximately 40% to 50%, the volume was not smaller than 7 cm³ and not larger than 9 cm³ and the thickness was not smaller than 10 mm and not larger than 15 mm. For example, the solid milk A having a porosity of 48% and 50% had a volume of 8.512 cm³ and 8.512 cm³, respectively. The solid milk B having a porosity of 48% and 50% had a volume of 8.615 cm³ and 8.960 cm³, respectively. The flat solid milk A having a porosity of 48% and 50% had a thickness of 12.05 mm and 12.52 mm, respectively. The flat solid milk B having a porosity of 48% and 50% had a thickness of 12.19 mm and 12.67, respectively. The shallow trapezoidal solid milk A having a porosity of 48% and 50% had a thickness of 12.79 mm and 13.26 mm, respectively. The shallow trapezoidal solid milk B having a porosity of 48% and 50% had a thickness of 12.93 mm and 13.41, respectively. The deep trapezoidal solid milk A having a porosity of 48% and 50% had a thickness of 12.93 mm and 13.40 mm, respectively. The deep trapezoidal solid milk B having a porosity of 48% and 50% had a thickness of 13.07 mm and 13.55, respectively. The propeller solid milk A having a porosity of 48% and 50% had a thickness of 13.49 mm and 13.96 mm, respectively. The propeller solid milk B having a porosity of 48% and 50% had a thickness of 13.63 mm and 14.11, respectively. The overall capacities of the shallow trapezoidal, deep trapezoidal, and propeller recesses were 0.534 cm³, 0.637 cm³, and 1.042 cm³ and their largest depths were 2 mm, 4 mm, and 5 mm, respectively.

FIG. 15 shows the results obtained. FIG. 15 is a graphical representation showing the solubility of different forms of solid milk and granular milk. FIGS. 15(a) and (b) show the results of solubility measurement in which "the solid milk A" and "the solid milk B" had a porosity of 48% or 50% and the temperature of the test liquid used with the solid and granular milk was 50° C. In FIGS. 15(a) and (b), filled symbols present those having a porosity of 48% and open symbols present those having a porosity of 50%. It is understood from FIGS. 15(a) and (b) that the recesses serve to improve the solubility. Particularly, the propeller type exhibited the solubility close to the granular type.

EXAMPLE 6

A total of 5.4 g of "the milk powder A" was compression molded in a compression molding unit to a porosity of 48.5% or 50.5% (0.72 kN and 1.05 kN, respectively), moisturized in a steam oven at 65° C. and 100% RH for 60 sec, and dried in an air thermostatic chamber at 85° C. for 5 min to obtain "the solid milk A." A total of 5.6 g of "the milk powder B" was compression molded in a compression molding unit to a porosity of 48.5% or 50.5% (0.93 kN and 1.32 kN, respectively), moisturized in a steam oven at 65° C. and 100% RH for 60 sec, and dried in an air thermostatic chamber at 85° C. for 7 min to obtain "the solid milk B." "The solid milk A" and "the solid milk B" were shaped into the flat (regular) and spherical types. Here, assuming that the overall porosity of the solid milk was approximately 40% to 50%, the volume was not smaller than 7 cm³ and not larger than 9 cm³ and the thickness was not smaller than 10 mm and not larger than 15 mm. For example, the solid milk A having a porosity of 48.5% and 50.5% had a volume of 8.595 cm³ and 8.942 cm³, respectively. The solid milk B having a porosity of 48.5% and 50.5% had a volume of 8.699 cm³ and 9.051 cm³, respectively. The spherical solid milk A having a porosity of 48.5% and 50.5% had a thickness of 12.56 mm and 13.04 mm, respectively. The spherical solid milk B having a porosity of 48.5% and 50.5% had a thickness of 12.70 mm and 13.19, respectively. The flat solid milk A having a porosity of 48.5% and 50.5% had a thickness of 12.16 mm and 12.64 mm, respectively. The flat solid milk B having a porosity of 48.5% and 50.5% had a thickness of 12.39 mm and 12.79, respectively. The total capacity of the spherical recesses was 0.339 cm³ and the largest depth of the recesses was 3 mm.

FIG. 16 shows the results obtained. FIG. 16 is a graphical representation showing the solubility of different forms of solid milk. FIG. 16(a) shows the results of solubility measurement in which "the solid milk A" had a porosity of 48.5% or 50.5% and the temperature of the test liquid used with the solid milk was 50° C. FIG. 16(b) shows the results of solubility measurement in which "the solid milk B" had a porosity of 48.5% or 50.5% and the temperature of the test liquid used with the solid milk was 50° C. In FIG. 16, filled circles present the flat type having a porosity of 48.5%, open circles present the spherical type having a porosity of 48.5%, filled triangles present the flat type having a porosity of 50.5%, and open triangles present the spherical type having a porosity of 50.5%. It is understood from FIG. 16 that the recesses serve to improve the solubility.

INDUSTRIAL APPLICABILITY

The food product or solid milk of the present invention is applicable in the food industry as highly soluble food products or solid milk.

BRIEF DESCRIPTION OF THE DRAWINGS

FIG. 1 is an illustration showing the basic structure of the solid milk of the present invention. FIG. 1(a) is a top view, FIG. 1(b) is a side view, and FIG. 1(c) is a bottom view.

FIG. 2 is an illustration showing the basic structure of the solid milk of the present invention having a recess only on the top surface. FIG. 2(a) is a top view, FIG. 2(b) is a side view, and FIG. 2(c) is a bottom view.

FIG. 3 is an illustration showing solid milk having two recesses both on the top surface and on the bottom surface. FIG. 3(a) is a top view and FIG. 3(b) is a bottom view.

FIG. 4 shows solid milk of a flat type as a reference example having the center line. FIG. 4(a) is a schematic view, FIG. 4(b) is a draft, and FIG. 4(c) shows the tips of the upper and lower pestles.

FIG. 5 shows solid milk of a spherical type having hemispherical recesses. FIG. 5(a) is a schematic view, FIG. 5(b) is a draft, and FIG. 5(c) shows the tips of the upper and lower pestles.

FIG. 6 shows solid milk of a shallow trapezoidal type having shallow trapezoidal recesses. FIG. 6(a) is a schematic view, FIG. 6(b) is a draft, and FIG. 6(c) shows the tips of the upper and lower pestles.

FIG. 7 shows solid milk of a deep trapezoidal type having deep trapezoidal recesses. FIG. 7(a) is a schematic view, FIG. 7(b) is a draft, and FIG. 7(c) shows the tips of the upper and lower pestles.

FIG. 8 shows solid milk of a propeller type having recesses provided at opposed positions with their deepest points at staggered positions. FIG. 8(a) is a schematic view, FIG. 8(b) is a draft, and FIG. 8(c) shows the tips of the upper and lower pestles. FIG. 8(d) is a cross-sectional view at A-A' in FIG. 8(a) and FIG. 8(e) is a cross-sectional view at B-B' in FIG. 8(a).

FIG. 9 shows solid milk of a shallow pit type. FIG. 9(a) is a schematic view, FIG. 9(b) is a draft, and FIG. 9(c) shows the tips of the upper and lower pestles. FIG. 9(d) is a cross-sectional view at A in FIG. 9(b).

FIG. 10 shows solid milk of a deep pit type. FIG. 10(a) is a schematic view, FIG. 10(b) is a draft, and FIG. 10(c) shows the tips of the upper and lower pestles. FIG. 10(d) is a cross-sectional view at A in FIG. 10(b). FIG. 10(e) is a cross sectional view at B-B' in FIG. 10(a) and FIG. 10(f) is a cross-sectional view at C-C' in FIG. 10(a).

FIG. 11 is a graphical representation showing the shape and recess capacity of solid milk and the average insoluble residue of solid milk. FIG. 11(a) shows the results of solubility measurement in which "the solid milk A" had a porosity of 48% and the temperature of the test liquid used with the solid milk was 50° C. FIG. 11(b) shows the results of solubility measurement in which "the solid milk B" had a porosity of 48% and the temperature of the test liquid used with the solid milk was 50° C. However, the spherical type samples all had a porosity of 48.5%.

FIG. 12 is a graphical representation showing the shape and recess largest depth of solid milk and the average insoluble residue of solid milk. FIG. 12(a) shows the results of solubility measurement in which "the solid milk A" had a porosity of 48% and the temperature of the test liquid used with the solid milk was 50° C. FIG. 12(b) shows the results of solubility measurement in which "the solid milk B" had a porosity of 48% and the temperature of the test liquid used with the solid milk was 50° C. However, the spherical type samples all had a porosity of 48.5%.

FIG. 13 is a graphical representation showing the shape of solid milk and the insoluble residue of solid milk. FIG. 13(a) shows the results of solubility measurement in which "the solid milk A" had a porosity of 46% or 48% and the liquid temperature was 50° C. FIG. 13(b) shows the results of solubility measurement in which "the solid milk B" had a porosity of 48% and the temperature of the test liquid used with the solid milk was 50° C.

FIG. 14 is a graphical representation showing the shape of solid milk and the insoluble residue of solid milk. FIG. 14(a) shows the results of solubility measurement in which "the solid milk A" had a porosity of 48% and the liquid temperature was 50° C. FIG. 14(b) shows the results of solubility measurement in which "the solid milk B" had a porosity of 48% and the temperature of the test liquid used with the solid milk was 50° C.

FIG. 15 is a graphical representation showing the different forms of solid milk and the insoluble residue of solid and granular milk. FIG. 15(a) shows the results of solubility measurement in which "the solid milk A" having a porosity of 48% or 50% and granular milk were used and the test liquid temperature was 50° C. FIG. 15(b) shows the results of solubility measurement in which "the solid milk B" having a porosity of 48% or 50% and granular milk were used and the test liquid temperature was 50° C. In FIG. 15, filled symbols present those having a porosity of 48% and open symbols present those having a porosity of 50%.

FIG. 16 is a graphical representation showing the solubility of different forms of solid milk. FIG. 16(a) shows the results of solubility measurement in which "the solid milk A" had a porosity of 48.5% or 50.5% and the temperature of the test liquid used with the solid milk was 50° C. FIG. 16(b) shows the results of solubility measurement in which "the solid milk B" had a porosity of 48.5% or 50.5% and the temperature of the test liquid used with the solid milk was 50° C. In FIG. 16, filled circles present the flat type having a porosity of 48.5%, open circles present the spherical type having a porosity of 48.5%, filled triangles present the flat type having a porosity of 50.5%, and open triangles present the spherical type having a porosity of 50.5%.

LEGEND 1 food product (solid milk)
2 flat area
4 top surface
6 flat area
8 bottom surface
10 recess on the top surface
12 recess on the bottom surface
14 largest depth of the recess on the top surface
16 largest depth of the recess on the bottom surface
18 thickness of food product

The invention claimed is:

1. A food product (1) to be dissolved in water, comprising:
a top surface (4) having a flat area (2);
a bottom surface (8) having a flat area (6) parallel to the flat area (2) on the top surface; and
either one or both of a recess (10) formed on the top surface (4) and a recess (12) formed on the bottom surface (8);
wherein, when the food product has both the recess (10) formed on the top surface (4) and the recess (12) formed on the bottom surface (8), the total of the largest depth $d_u$ (14) of the recess (10) on the top surface and the largest depth $d_d$ (16) of the recess (12) on the bottom surface is 30% or larger of the thickness w (18) of the food product, and
when the food product has either one of the recess (10) formed on the top surface (4) and the recess (12) formed on the bottom surface (8), the largest depth $d_u$ (14) of the recess (10) on the top surface or the largest depth $d_d$ (16) of the recess (12) on the bottom surface is 30% or larger of the thickness w (18) of the food product,
wherein the food product is a solid milk obtained by compressing only milk powder to obtain compressed milk powder, moisturizing the compressed milk powder to produce a moisturized compressed milk powder, and drying the moisturized compressed milk powder to produce the solid milk, wherein a porosity of the solid milk is 30% to 60% and a volume of the solid milk is 2 cm$^3$ to 30 cm$^3$.

2. The food product according to claim 1, wherein the food product has both the recess (10) formed on the top surface (4)

and the recess (12) formed on the bottom surface (8) and the total capacity of the two recesses (10, 12) is 4% or larger of the volume of the food product.

3. The food product according to claim 1, wherein the food product has both the recess (10) formed on the top surface (4) and the recess (12) formed on the bottom surface (8) and the total capacity of the two recesses (10, 12) is 6% or larger of the volume of the food product.

4. The food product according to claim 1, wherein the food product has both the recess (10) formed on the top surface (4) and the recess (12) formed on the bottom surface (8) and the total of the largest depth $d_u$ (14) of the recess (10) on the top surface and the largest depth $d_d$ (16) of the recess (12) on the bottom surface is 40% or larger of the thickness w (18) of the food product.

5. The food product according to claim 1, wherein the food product has both the recess (10) formed on the top surface (4) and the recess (12) formed on the bottom surface (8);
the top surface (4) has two recesses (10a, 10b) formed at positions symmetrical about the center line (20) of the top surface (4);
the bottom surface (8) has two recesses (12a, 12b) formed at positions symmetrical about the center line (22) of the bottom surface (8); and
the center line (20) of the top surface and the center line (22) of the bottom surface are parallel.

6. The food product according to claim 1, wherein the food product has both the recess (10) formed on the top surface (4) and the recess (12) formed on the bottom surface (8);
the recess (10) on the top surface (4) and the recess (12) on the bottom surface (8) are provided at opposed positions and the deepest point (24) of the recess (10) on the top surface and the deepest point (26) of the recess (12) on the bottom surface (8) that is opposed to the recess (10) on the top surface are provided at staggered positions, not at opposed positions.

7. The food product according to claim 1, wherein the food product has both the recess (10) formed on the top surface (4) and the recess (12) formed on the bottom surface (8);
the top surface (4) has two recesses (10a, 10b) formed at positions symmetrical about the center line (20) of the top surface (4);
the bottom surface (8) has two recesses (12a, 12b) formed at positions symmetrical about the center line (22) of the bottom surface (8);
the center line (20) of the top surface and the center line (22) of the bottom surface are parallel;
the recess (10a) on the top surface (4) and the recess (12a) on the bottom surface (8) are provided at opposed positions and the deepest point (24a) of the recess (10a) on the top surface and the deepest point (26a) of the recess (12a) on the bottom surface (8) that is opposed to the recess (10a) on the top surface are provided at staggered positions, not at opposed positions; and
the other recess (10b) on the top surface (4) and the other recess (12b) on the bottom surface (8) are provided at opposed positions and the deepest point (24b) of the other recess (10b) on the top surface and the deepest point (26b) of the other recess (12b) on the bottom surface (8) that is opposed to the other recess (10b) on the top surface are provided at staggered positions, not at opposed positions.

8. A food product (1) to be dissolved in water, wherein:
the food product (1) either has a recess (10) only on one surface or has a pair of recesses (10, 12) formed at positions symmetrical about the gravity center of the food product;
when the food product has the recess (10) only on one surface, the largest depth $d_u$ (14) of the recess (10) is 30% or larger of the thickness w (18) of the food product; and
when the food product has the pair of recesses (10, 12) formed at positions symmetrical about the gravity center of the food product, the total of the largest depth $d_u$ (14) of one recess (10) and the largest depth $d_d$ (16) of the other recess (12) is 30% or larger of the thickness w (18) of the food product,
wherein the food product is a solid milk obtained by compressing only milk powder to obtain compressed milk powder, moisturizing the compressed milk powder to produce a moisturized compressed milk powder, and drying the moisturized compressed milk powder to produce the solid milk, wherein a porosity of the solid milk is 30% to 60% and a volume of the solid milk is 2 cm$^3$ to 30 cm$^3$.

* * * * *